United States Patent
Hui et al.

(10) Patent No.: US 10,764,161 B2
(45) Date of Patent: Sep. 1, 2020

(54) METHOD FOR TRAFFIC ENGINEERING IN COMMUNICATIONS NETWORK AND CONTROLLER

(71) Applicant: HUAWEI TECHNOLOGIES CO., LTD., Shenzhen, Guangdong (CN)

(72) Inventors: Shui Wing David Hui, Hong Kong (HK); Gong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 16/054,087

(22) Filed: Aug. 3, 2018

(65) Prior Publication Data
US 2018/0343176 A1    Nov. 29, 2018

Related U.S. Application Data

(63) Continuation of application No. PCT/CN2017/072446, filed on Jan. 24, 2017.

(30) Foreign Application Priority Data

Feb. 5, 2016    (CN) .......................... 2016 1 0081473

(51) Int. Cl.
*H04L 12/26*    (2006.01)
*H04L 12/717*    (2013.01)
(Continued)

(52) U.S. Cl.
CPC ........ *H04L 43/022* (2013.01); *H04L 41/0823* (2013.01); *H04L 41/142* (2013.01);
(Continued)

(58) Field of Classification Search
CPC ..... H04L 43/022; H04L 45/64; H04L 41/142; H04L 41/16; H04L 45/70; H04L 41/0823;
(Continued)

(56) References Cited

U.S. PATENT DOCUMENTS

| 7,398,438 B2 | 7/2008 | Agarwal et al. |
| 2007/0271374 A1 | 11/2007 | Shomura et al. |

(Continued)

FOREIGN PATENT DOCUMENTS

| CN | 1705887 A | 12/2005 |
| CN | 101075911 A | 11/2007 |

(Continued)

OTHER PUBLICATIONS

Abdulsalam Yassine et al, Software Defined Network Traffic Measurement: Current Trends and Challenges. IEEE Instrumentation and Measurement Magazine ( vol. 18, Issue: 2, Apr. 2015 ), p. 42-50.

(Continued)

*Primary Examiner* — Tu T Nguyen
(74) *Attorney, Agent, or Firm* — Fish & Richardson P.C.

(57) ABSTRACT

The present disclosure relates to a method for traffic engineering in a communications network. In one example method, a controller determines at least one sampling node in a flexible node and a temporal frequency for traffic sampling. The controller instruct the at least one sampling node to perform traffic sampling at the temporal frequency. The controller receives sampled traffic data of all sampling nodes obtained during each sampling. The controller determines, according to the sampled traffic data obtained during each sampling and information about total traffic of a link whose link utilization is greater than a first preset value or less than a second preset value in the communications network, parameter information for traffic engineering. The controller performs traffic engineering control according to the parameter information.

20 Claims, 4 Drawing Sheets

(51) Int. Cl.

| | | |
|---|---|---|
| *H04L 12/70* | (2013.01) | |
| *H04L 12/24* | (2006.01) | |
| *H04L 12/721* | (2013.01) | |
| *H04L 12/715* | (2013.01) | |
| *H04L 12/751* | (2013.01) | |
| *H04L 12/803* | (2013.01) | |

(52) U.S. Cl.
CPC ............ *H04L 41/16* (2013.01); *H04L 43/026* (2013.01); *H04L 43/0882* (2013.01); *H04L 43/0888* (2013.01); *H04L 43/12* (2013.01); *H04L 45/02* (2013.01); *H04L 45/123* (2013.01); *H04L 45/42* (2013.01); *H04L 45/64* (2013.01); *H04L 45/70* (2013.01); *H04L 47/00* (2013.01); *H04L 47/125* (2013.01); *H04L 41/12* (2013.01)

(58) Field of Classification Search
CPC ..... H04L 43/12; H04L 43/0882; H04L 47/00; H04L 47/125; H04L 45/123; H04L 45/02; H04L 43/0888; H04L 43/026; H04L 45/42; H04L 41/12; H04L 47/10; H04L 43/024
USPC .......................................................... 709/224
See application file for complete search history.

(56) References Cited

U.S. PATENT DOCUMENTS

| | | | | |
|---|---|---|---|---|
| 2011/0142025 | A1* | 6/2011 | Agee | H04B 7/0413 370/342 |
| 2013/0064079 | A1 | 3/2013 | Zhang | |
| 2013/0272125 | A1* | 10/2013 | Espina Perez | H04L 47/12 370/230 |
| 2014/0112187 | A1 | 4/2014 | Kang et al. | |
| 2016/0021014 | A1* | 1/2016 | Wetterwald | H04L 47/2441 370/235 |

FOREIGN PATENT DOCUMENTS

| | | |
|---|---|---|
| CN | 101416455 A | 4/2009 |
| CN | 102175269 A | 9/2011 |
| CN | 104579810 A | 4/2015 |
| CN | 104796348 A | 7/2015 |
| EP | 3267640 A1 | 1/2018 |
| EP | 1579227 B1 | 8/2018 |
| WO | 2007126616 A2 | 11/2007 |

OTHER PUBLICATIONS

Yi-Chao Chen et al, Robust Network Compressive Sensing. MobiCom'14, Sep. 7-11, 2014, Maui, Hawaii, USA., 12 pages.
Sugam Agarwal et al, Traffic Engineering in Software Defined Networks. 2013 Proceedings IEEE INFOCOM, 9 pages.
Bernard Fortz et al, Optimizing OSPF/IS-IS Weights in a Changing World. IEEE Journal on Selected Areas in Communications, vol. 20, No. 4, May 2002, p. 756-767.
T. Tony Cai et al, Sharp RIP Bound for Sparse Signal and Low-Rank Matrix Recovery. arXiv:1302.1236v1 [cs.IT] Feb. 6, 2013, 33 pages.
Emamnuel J. Candès, Compressive sampling. Proceedings of the International Congress of Mathematicians, Madrid, Spain, 2006, 20 pages.
Emmanuel J. Candes et al, Decoding by Linear Programming. IEEE Transactions on Information Theory, vol. 51, No. 12, Dec. 2005, p. 4203-4215.
Mohammad H. Firooz et al, Network Tomography via Compressed Sensing. 2010 IEEE Global Telecommunications Conference Globecom 2010, Jan. 10, 2011, 5 pages.
Ning Wang et al, An overview of routing optimization for internet traffic engineering. IEEE Communications Surveys and Tutorials ( vol. 10, Issue: 1, First Quarter 2008 ), 21 pages.
T. Leighton et al, Fast Approximation Algorithms for Multicommodity Flow Problems. Aug. 1991, 28 pages.
L.K. Fleischer, Approximating fractional multicommodity flow independent of the number of commodities. 40th Annual Symposium on Foundations of Computer Science (Cat. No. 99CB37039), Aug. 6, 2002, 8 pages.
George Karakostas, Faster Approximation Schemes for Fractional Multicommodity Flow Problems . the 13th Annual ACM/SIAM Symposium on Discrete Algorithms (SODA), 2002 , 15 pages.
Mingrui Yang et al, Orthogonal Matching Pursuit With Thresholding and its Application in Compressive Sensing. IEEE Transactions on Signal Processing, vol. 63, No. 20, Oct. 15, 2015, p. 5479-5486.
Rick Chartrand, Exact Reconstruction of Sparse Signals via Nonconvex Minimization. IEEE Signal Processing Letters, vol. 14, No. 10, Oct. 2007, p. 707-710.
Rick Chartrand et al, Iteratively Reweighted Algorithms for Compressive Sensing. IEEE International Conference on Acoustics, Speech and Signal Processing, 2008. ICASSP 2008., 4 pages.
Yun-Bin Zhao et al, Reweighted $\ell$1-Minimization for Sparse Solutions to Underdetermined Linear Systems. Published in SIAM Journal on Optimization, 22 (2012), No. 3, pp. 1065-1088.
International Search Report issued in International Application No. PCT/CN2017/072446 dated Apr. 11, 2017, 17 pages.
Extended European Search Report issued in European Application No. 17746907.9 dated Dec. 10, 2018, 12 pages.
Office Action issued in Chinese Application No. 201610081473.8 dated Jul. 2, 2019, 7 pages.

\* cited by examiner

METHOD FOR TRAFFIC ENGINEERING IN COMMUNICATIONS NETWORK AND CONTROLLER

CROSS-REFERENCE TO RELATED APPLICATIONS

This application is a continuation of International Application No. PCT/CN2017/072446, filed on Jan. 24, 2017, which claims priority to Chinese Patent Application No. 201610081473.8, filed on Feb. 5, 2016. The disclosures of the aforementioned applications are hereby incorporated by reference in their entireties.

TECHNICAL FIELD

This application relates to the communications field, and in particular, to a method for traffic engineering in a communications network and a controller.

BACKGROUND

Network traffic engineering (TE) is a method for controlling network traffic, so as to achieve some specific holistic objectives in a network, for example, optimizing network utilization, balancing network utilization, reducing network congestion, and reducing network load.

To achieve the holistic objectives in the network, a most common TE implementation method is to estimate (or collect statistics about) all source and destination connection requirements in the entire network, and then use various routing mechanisms (or network protocols) to perform optimization according to a TE objective. As a network scale is increasing, an original TE method has huge computational complexity, and feasibility of performing all TE steps is extremely low. For example, most typical routing protocols used in the Internet are all generated based on the following two mechanisms:

a distance vector routing protocol, such as the Routing Information Protocol (RIP) or the Border Gateway Protocol; and a link state (Link State) routing protocol, such as the Open Shortest Path First protocol.

However, an existing routing protocol may have excessively high computational complexity (especially for a large-scale network). For example, the distance vector routing protocol uses the Bellman-Ford (Bellman-Ford) algorithm and features complexity of $O(|V|*|E|)$, where $|V|$ is a quantity of nodes (number of nodes), and $|E|$ is a quantity of edges (number of edges); the link state routing protocol usually uses some variants of the Dijkstra algorithm and features complexity of $O(|E|+|V|\log|V|)$. In these routing protocols, a method for calculating a best path is setting a short-term link cost to a cost related to a distance from a destination. However, in TE, these algorithms further need to run repeatedly to update the short-term link cost, so as to implement the specific objectives for entire-network control. This manifests excessively high complexity. In actual application, a network traffic engineer usually uses a manual trial-out method to update the short-term link cost. The procedure is extremely complicated and cannot be implemented in the large-scale network. Some existing types of TE are implemented by using a Multiprotocol Label Switching (MPLS) method, but require a cost for establishing a link label. Although the existing routing protocol does not repeatedly run in MPLS, the label needs to be repeatedly updated to implement a TE optimization objective. These are only some examples, and actual TE implementation depends on the network traffic engineer. For example, during selection, the network traffic engineer may use some variants of the foregoing protocols, for example, change the link cost or an objective, or allow for multiple paths, so as to implement a TE objective. However, repeated running of these algorithms cannot be avoided. As the network scale increases, if all TE steps, that is, from estimating an entire-network link traffic requirement to optimizing entire-network routing according to the TE objective, need to be completed, original TE is no longer applicable because of its huge complexity.

In addition, the entire-network link traffic requirement required in network traffic engineering is estimated based on network status data. If a TE algorithm runs slowly, effective network status information used in TE is actually limited (sparse) as a network status changes, even when the network status data is sampled at a high frequency. However, all existing TE technologies are based on an assumption that the network status data is sufficient and unchanged. When there is only sparse network status data, it is difficult to implement TE control according to an original entire-network-based algorithm.

Basically, all networks have TE problems. Because a software defined network (SDN) is an important constructable structure for a future network, the following uses the SDN network as an example to describe an existing TE problem. The SDN separates a control plane from a data plane. Because an SDN controller provides relatively strong network controllability (unlike a previous distributed network, the SDN uses a centralized controller architecture), TE efficiency in the SDN is higher than that in an existing network. However, to achieve (potentially) best TE efficiency in the SDN (at least higher than TE efficiency in the existing network), the prior art also needs to be based on the entire network's status.

For the SDN network, the SDN has a centralized architecture (so that TE efficiency in the SDN is higher than that in the existing network). Before TE control is performed, an entire-network traffic requirement needs to be estimated. If all related information required in TE in the entire network is sampled and fed back to the SDN controller, extremely high overheads may be required for measurement data feedback. In addition, a validity period of the information is usually shorter than a TE operation time (because as described above, the SDN controller requires a large quantity of operations because of high computational complexity, a network scenario change is normal before an operation result is obtained). In addition, an existing SDN technology requires complete network information (which usually requires intensive sampling), and further it is required to assume that the network information is an invariant (that is, a constant) during a TE control operation. It is difficult to implement TE control according to the original entire-network-based algorithm.

To reduce a large amount of unnecessary measurement and feedback and achieve the TE objective in real time, a most important problem is how to set some general TE optimization objectives that can use downsampled data having low feedback overheads and that can be achieved by using an algorithm having low complexity in an environment of low sampling and low feedback overheads, and to achieve an effect equivalent to an expected TE effect in the entire SDN in an entire observable environment.

Therefore, in the existing network, how to implement TE based on partial measurement becomes a problem that needs to be urgently resolved.

SUMMARY

Embodiments of the present application provide a method for traffic engineering in a communications network and a controller. The method can implement TE based on partial measurement.

According to a first aspect, a method for traffic engineering in a communications network is provided, where the communications network includes a controller and multiple nodes, the multiple nodes include a flexible node and a non-flexible node, the flexible node is directly connected to the controller, the non-flexible node is indirectly connected to the controller, and the method includes:

determining, by the controller, at least one sampling node in the flexible node and a temporal frequency for traffic sampling;

instructing, by the controller, the at least one sampling node to perform traffic sampling at the temporal frequency, and receiving sampled traffic data that is of all sampling nodes and that is obtained during each sampling;

determining, by the controller according to the sampled traffic data obtained during each sampling and information about total traffic of a link whose link utilization is greater than a first preset value or less than a second preset value in the communications network, parameter information required for traffic engineering; and performing, by the controller, traffic engineering control according to the parameter information.

Therefore, traffic sampling is performed at the temporal frequency by the determined at least one sampling node. The controller instructs the at least one sampling node to sample data at the temporal frequency, and receives the sampled traffic data that is of all sampling nodes and that is obtained during each sampling; determines, according to the sampled traffic data, the parameter information required for traffic engineering; and finally performs traffic engineering control according to the parameter information. High-efficiency and high-performance TE control is implemented based on partial measurement.

It should be understood that the sampled traffic data includes service traffic that passes through or starts from each sampling node in the communications network and goes to each destination node in the communications network.

It should be understood that the controller may instruct the sampling node in an existing manner, for example, in a flow table delivery manner. This is not limited in this embodiment of the present application. Alternatively, the controller may obtain, in an existing manner, the sampled data sent by the sampling node. This is not limited in this embodiment of the present application.

An objective of traffic engineering control is to achieve some TE objectives, for example, reducing network congestion, optimizing network utilization, and balancing network load. The controller may reduce maximum link utilization in the communications network to achieve some TE objectives.

With reference to the first aspect, in an implementation of the first aspect, the sampled traffic data includes service traffic that passes through or starts from each sampling node in the communications network and goes to each destination node in the communications network.

With reference to the first aspect and the foregoing implementation of the first aspect, in another implementation of the first aspect, the determining, by the controller, at least one sampling node in the flexible node and a temporal frequency for traffic sampling includes:

determining, by the controller according to estimated total traffic of a service in the communications network, the at least one sampling node and the temporal frequency for traffic sampling.

With reference to the first aspect and the foregoing implementations of the first aspect, in another implementation of the first aspect, the determining, by the controller according to estimated total traffic of a service in the communications network, the at least one sampling node and the temporal frequency for traffic sampling includes:

determining, by the controller, a quantity of the at least one sampling node and the temporal frequency according to the following formulas:

$|C_s|=\gamma_{11}|C|$ $V*T_s=\gamma_{12} \log(|C_s|)$ or $|C_s|=\log(\gamma_{21}|C|)$ $V*T_s=\gamma_{22}|C_s|$, where $|C_s|$ indicates the quantity of sampling nodes, $T_s$ indicates the sampling frequency, V indicates the estimated total traffic, C indicates a set of flexible nodes in the communications network, $|C|$ indicates a quantity of flexible nodes in the communications network, $\gamma_{11}$, $\gamma_{12}$, $\gamma_{21}$, and $\gamma_{22}$ are preset constant parameters, $0<\gamma_{11}<1$, and $0<\log(\gamma_{21}|C|)<|C|$; and after determining the quantity of sampling nodes, randomly selecting, by the controller, $|C_s|$ nodes from the set of flexible nodes, and using the $|C_s|$ nodes as a set of the sampling nodes; where:

it should be understood that, in this embodiment of the present application, a random probability is not limited, for example, an equal probability may be available, the probability may be determined according to a quantity of historical node access times, or the probability may be determined according to a node degree, and this is not limited in this embodiment of the present application; or determining, by the controller, a quantity of the at least one sampling node and the temporal frequency for each destination node d according to the following formulas:

$|C_s^d|=\gamma_{11}^d|C|$ $V^d*T_s^d=\gamma_{12}^d \log(|C_s^d|)$ or $|C_s^d|=\log(\gamma_{21}^d|C|)$ $V^d*T_s^d=\gamma_{22}^d|C_s^d|$, where $|C_s^d|$ indicates a quantity of sampling nodes corresponding to the destination node d, $T_s^d$ indicates a sampling frequency corresponding to the destination node d, $V^d$ indicates estimated total traffic to the destination node d, C indicates a set of flexible nodes in the communications network, $|C|$ indicates a quantity of flexible nodes in the communications network, $\gamma_{11}^d$, $\gamma_{12}^d$, $\gamma_{21}^d$, and $\gamma_{22}^d$ are preset constant parameters, $0<\gamma_{11}^d<1$, and $0<\log(\gamma_{21}^d|C|)<|C|$; and after determining the quantity of sampling nodes, selecting, by the controller, for each destination node d, $|C_s^d|$ nodes in a path in a directed acyclic graph DAG that is pre-generated based on a topology of flexible nodes and using the $|C_s^d|$ nodes as a set of the sampling nodes, or randomly selecting $|C_s^d|$ nodes from the set of flexible nodes and using the $|C_s^d|$ nodes as a set of the sampling nodes.

For example, each selected sampling node is selected from an independent path in the DAG. For example, $|C_s^d|$ common nodes are selected from a common DAG portion of all destination nodes d. That is, the destination nodes d may have a same DAG graph, or may have different DAG graphs. This embodiment of the present application is not limited thereto.

With reference to the first aspect and the foregoing implementations of the first aspect, in another implementation of the first aspect, the parameter information required for traffic engineering includes injected service traffic from each flexible node to each destination node in the communications network and uncontrollable service traffic in a link whose link utilization is greater than a preset value in the communications network; and the determining, by the controller according to the sampled traffic data obtained during each sampling and information about total traffic of a link whose link utilization is greater than a first preset value or less than a second preset value in the communications network, parameter information required for traffic engineering includes: determining, according to the following formula (1), the parameter information required for traffic engineering:

$$\operatorname*{Min}_{\Delta I} \|vec(\Delta I)\|_{l_0} \quad (1)$$

where constraint conditions are:

$$W_{wd} = \sum_{u \leq w} \beta_w(u, d) I_{ud}$$

$$I_{current} = I_{ud} = \Delta I + I_{last\ iteration}$$

$$g(e) = f(e) - \sum_{u \in C} \sum_{d \in N} \alpha_e(u, d) I_{ud}, \quad \forall\, e \in E$$

where E indicates a set of all links in the communications network, N indicates a set of all nodes in the communications network, and C indicates a set of all flexible nodes in the communications network;

w indicates a sampling node, u indicates a flexible node, d indicates a destination node, ΔI indicates a difference between injected traffic $I_{last\ iteration}$ of the flexible node u that is obtained during previous sampling and injected traffic $I_{ud}$ of the flexible node u that is obtained during current sampling, and vec(ΔI) indicates that all elements ΔI (for all flexible nodes u) are combined as a vector;

$\operatorname*{Min}_{\Delta I} \|vec(\Delta I)\|_{l_0}^l$ indicates a minimum $l_0$ norm of vec(ΔI);

e indicates a link whose link utilization is greater than the first preset value or a link whose link utilization is less than the second preset value in the communications network, f(e) indicates total traffic of the link e, and g(e) indicates uncontrollable service traffic in the link e;

$W_{wd}$ indicates service traffic that passes through or starts from the sampling node w in the communications network and goes to the node d in the communications network, and $I_{ud}$ indicates injected service traffic from the flexible node u to the destination node d; and $\alpha_e(u,d)$ indicates a total fraction of a packet that is transmitted from the node u to the destination d and passes through the link e, $\beta_w(u,d)$ indicates a total fraction of a packet that is transmitted from the node u to the destination d and passes through the sampling node w, and u≤w indicates that w is passed through by a packet transmitted from u.

The foregoing has described solving $l_0$ norm minimization to determine the parameter information required for traffic engineering. In this embodiment of the present application, the parameter information required for traffic engineering may be determined in another alternative manner. For example, the parameter information required for traffic engineering may be determined by solving $l_1$ norm minimization, weighted $l_1$ norm minimization, or $l_p$ norm minimization, where 0<p≤1. Details are separately described below.

With reference to the first aspect and the foregoing implementations of the first aspect, in another implementation of the first aspect, the parameter information required for traffic engineering includes injected service traffic from each flexible node to each destination node in the communications network and uncontrollable service traffic in a link whose link utilization is greater than a preset value in the communications network; and the determining, by the controller according to the sampled traffic data obtained during each sampling and information about total traffic of a link whose link utilization is greater than a first preset value or less than a second preset value in the communications network, parameter information required for traffic engineering includes: determining, according to any one of the following formula (2), formula (3), or formula (4), the parameter information required for traffic engineering:

$$\min_{\Delta I} \|vec(\Delta I)\|_{l_1} \quad (2)$$

where constraint conditions are:

$$W_{wd} = \sum_{u \leq w} \beta_w(u, d) I_{ud} \quad \forall\, w \in C_s, d \in N$$

$$I_{current} = I_{ud} = \Delta I + I_{last\ iteration}$$

$$g(e) = f(e) - \sum_{u \in C} \sum_{d \in N} \alpha_e(u, d) I_{ud}, \quad \forall\, e \in E$$

where E indicates a set of all links in the communications network, N indicates a set of all flexible nodes in the communications network, and C indicates a set of all flexible nodes in the communications network;

w indicates a sampling node, u indicates a flexible node, d indicates a destination node, ΔI indicates a difference between injected traffic $I_{last\ iteration}$ of the flexible node u that is obtained during previous sampling and injected traffic $I_{ud}$ of the flexible node u that is obtained during current sampling, and vec(ΔI) indicates that all elements ΔI (for all flexible nodes u) are combined as a vector;

$$\min_{\Delta I} \|vec(\Delta I)\|_{l_1}$$

indicates a minimum $l_1$ norm of vec(ΔI);

e indicates a link whose link utilization is greater than the first preset value or a link whose link utilization is less than the second preset value in the communications network, f(e) indicates total traffic of the link e, and g(e) indicates uncontrollable service traffic in the link e;

$W_{wd}$ indicates service traffic that passes through or starts from the sampling node w in the communications network and goes to the node d in the communications network, and $I_{ud}$ indicates injected service traffic from the flexible node u to the destination node d; and $\alpha_e(u,d)$ indicates a total fraction of a packet that is transmitted from the node u to the destination d and passes through the link e, $\beta_w(u,d)$ indicates a total fraction of a packet that is transmitted from the node u to the destination d and passes through the sampling node w, and u≤w indicates that w is passed through by a packet transmitted from u;

$$\min_{\Delta I} \|\text{diag}(m)\text{vec}(\Delta I)\|_{l_1} \qquad (3)$$

where constraint conditions are:

$$W_{wd} = \sum_{u \le w} \beta_w(u,d) I_{ud} \quad \forall w \in C_s, d \in N$$

$$I_{current} - I_{ud} - \Delta I + I_{last\ iteration}$$

$$g(e) = f(e) - \sum_{u \in C} \sum_{d \in N} \alpha_e(u,d) I_{ud}, \quad \forall e \in E$$

where m indicates a weight, $$m = \frac{1}{\varepsilon + |\Delta I|},$$

an initial value of m is 1, diag(m) indicates a diagonal matrix, and if a $u^{th}$ element of vec($\Delta I$) is $\Delta I$, a $u^{th}$ diagonal element of the diagonal matrix is $$m = \frac{1}{\varepsilon + |\Delta I|}; \text{ and } \min_{\Delta I} \|\text{diag}(m)\text{vec}(\Delta I)\|_{l_1}$$

indicates a minimum $l_1$ norm of diag(m)vec($\Delta I$).

$$\min_{\Delta I} \|\text{vec}(\Delta I)\|_{l_p} \qquad (4)$$

where constraint conditions are:

$$W_{wd} = \sum_{u \le w} \beta_w(u,d) I_{ud} \quad \forall w \in C_s, d \in N$$

$$I_{current} = I_{ud} = \Delta I + I_{last\ iteration}$$

$$g(e) = f(e) - \sum_{u \in C} \sum_{d \in N} \alpha_e(u,d) I_{ud}, \quad \forall e \in E; \text{ and}$$

$$\min_{\Delta I} \|\text{vec}(\Delta I)\|_{l_p}$$

indicates a minimum $l_p$ norm of vec($\Delta I$), and 0<p≤1.

With reference to the first aspect and the foregoing implementations of the first aspect, in another implementation of the first aspect, the determining, by the controller according to the sampled traffic data obtained during each sampling and information about total traffic of a link whose link utilization is greater than a first preset value or less than a second preset value in the communications network, parameter information required for traffic engineering includes: determining, according to any one of the formula (2) or the formula (3) solved by using a convex optimization method (which may include a gradient algorithm) or the formula (4) solved by using a successive convex approximation method (which may include a successive gradient algorithm), the parameter information required for traffic engineering.

With reference to the first aspect and the foregoing implementations of the first aspect, in another implementation of the first aspect, the performing, by the controller, traffic engineering control according to the parameter information includes: minimizing, by the controller, a cost of all paths in the communications network according to the parameter information.

With reference to the first aspect and the foregoing implementations of the first aspect, in another implementation of the first aspect, the minimizing, by the controller, a cost of all paths in the communications network according to the parameter information includes: minimizing, by the controller, a network cost of the communications network according to the following formula (5):

$$\min_{x(P)} U_c(\{\rho(e)\}_{\forall e}) \qquad (5)$$

where constraint conditions are:

$$\sum_{P \in P_{ud}} x(P) = I_{ud} \quad \forall u \in C, d \in N$$

$$x(P) \ge 0 \quad \forall P$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, and $P_{ud}$ indicates a set of all feasible paths from u to d; where:

it should be noted that an example of a feasible path is based on a conventional method, for example, in the OSPF (Open Shortest Path First) protocol, if u' is a point in a path P and is a conventional node (non-flexible node), a node next to u' in the path P is a next node in a shortest path to d; and another example of a feasible path may be a set of paths customized by a network administrator;

P∈$P_{ud}$ indicates that P is a feasible path $P_{ud}$, x(P) indicates traffic of the path P, $$\sum_{P \in P_{ud}} x(P)$$

indicates total traffic of all feasible paths from u to d, and ρ(e) indicates controllable bandwidth utilization of the link e, that is, $$\rho(e) \cong \frac{\sum_{P: e \in P} x(P)}{c(e) - g(e)},$$

where c(e) indicates total bandwidth of the link e, g(e) indicates uncontrollable traffic of the link e, and $$\sum_{P:e\in P} x(P)$$

indicates total controllable traffic of all feasible paths on the link e; and $U_c(\{\rho(e)\}_{\forall e})$ indicates the network cost, that is, a function constructed based on controllable bandwidth utilization of all links e, that is, if the controllable bandwidth utilization $U_c(\{\rho(e)\}_{\forall e})$ of all links e is set, $U_c(\{\rho(e)\}_{\forall e})$ may provide a real number indicating the cost, for example, if $$U_c(\{\rho(e)\}_{\forall e}) = \max_e \rho(e),$$

the cost is maximum utilization of all links; for another example, if $$U_c(\{\rho(e)\}_{\forall e}) = \sum_{u,d} \sum_{P\in P_{ud}} \gamma_P U_c^P(\{\rho(e)\}_{\forall e}),$$

the cost is a total cost of the path P $U_c^P(\{\rho(e)\}_{\forall e})$ that is weighted by using $\gamma_P$, where $U_c^P(\{\rho(e)\}_{\forall e})$ may be $$U_c^P(\{\rho(e)\}_{\forall e}) = \sum_{e\in P} \gamma_e U_c^e(\{\rho(e)\}_{\forall e}),$$

that is, a total cost of links e $U_c^e(\{\rho(e)\}_{\forall e})$ that is weighted by using $\gamma_e$, where the links e are on the path P, $U_c^e(\{\rho(e)\}_{\forall e})$ may be the link utilization $\rho(e)$, and the formula (5) indicates minimizing a most congested place (after weighting) in the communications network; or $U_c^e(\{\rho(e)\}_{\forall e})$ may be a reciprocal of the link utilization, that is, $1/\rho(e)$, and the formula (5) indicates minimizing a least balanced or least utilized place (after weighting) in the communications network.

With reference to the first aspect and the foregoing implementations of the first aspect, in another implementation of the first aspect, the minimizing, by the controller, a cost of all paths in the communications network according to the parameter information includes: minimizing, by the controller, a maximum cost of all paths in the communications network according to the following formula (6):

$$\min_{x(P)} \max_{P\in P_{ud}} U_c^P(\{\rho(e)\}_{\forall e\in P}) \quad (6)$$

where constraint conditions are:

$$\sum_{P\in P_{ud}} x(P) = I_{ud} \quad \forall u \in C, d \in N$$

$$x(P) \geq 0 \quad \forall P$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P\in P_{ud}$ indicates that P is a feasible path in $P_{ud}$, x(P) indicates traffic of the path P, $$\sum_{P\in P_{ud}} x(P)$$

indicates total traffic of all feasible paths from u to d, and P(e) indicates controllable bandwidth utilization of the link e, that is, $$\rho(e) \cong \frac{\sum_{P:e\in P} x(P)}{c(e) - g(e)},$$

where c(e) indicates total bandwidth of the link e, g(e) indicates uncontrollable traffic of the link e, and $$\sum_{P:e\in P} x(P)$$

indicates total controllable traffic of all feasible paths on the link e; and $U_c^P(\{\rho(e)\}_{\forall e})$ indicates a cost of the path P.

With reference to the first aspect and the foregoing implementations of the first aspect, in another implementation of the first aspect, the minimizing, by the controller, a cost of all paths in the communications network according to the parameter information includes: minimizing, by the controller, a network cost of the communications network according to a formula (5-11):

$$\min_{x(P),\theta} \theta \quad (5\text{-}11)$$

where constraint conditions are:

$$\sum_{P:e\in P} x(P) \leq h_e(\theta)(c(e) - g(e)) \quad \forall e \in E$$

$$\sum_{P\in P_{ud}} x(P) = I_{ud} \quad \forall u \in C, d \in N$$

$$x(P) \geq 0 \quad \forall P$$

$$0 \leq h_e(\theta) \leq 1$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P\in P_{ud}$ indicates that P is a feasible path in $P_{ud}$, x(P) indicates traffic of the path P, λ indicates a maximum network throughput proportion, $$\sum_{P\in P_{ud}} x(P)$$

indicates total traffic of all feasible paths from u to d, θ indicates a parameter related to maximum link utilization, $h_e(\theta)$ indicates a relation function of weight parameters and $\theta$, the weight parameters include $\gamma_e$ and $\gamma_P$, $\gamma_e$ indicates a weight parameter of the link e, $\gamma_P$ indicates a weight parameter of the path P, c(e) indicates total bandwidth of the link e, g(e) indicates uncontrollable traffic of the link e, and $$\sum_{P:e\in P} x(P)$$

indicates total controllable traffic of all feasible paths on the link e; and $h_e(\theta)$ may be any one of the following according to different weight values of the weight parameters $\gamma_e$ and $\gamma_P$:

$$h_e(\theta) = \frac{1}{\gamma_e} \frac{\theta}{\max_{P:e\in P} \gamma_P}; \ h_e(\theta) = \exp\left(\frac{1}{\gamma_e} \frac{\log\theta}{\max_{P:e\in P} \gamma_P}\right) \text{ or } \theta^{\frac{1}{\gamma_e} \frac{1}{\max_{P:e\in P} \gamma_P}};$$

$$h_e(\theta) = \exp\left(\frac{1}{\gamma_e} \log\left(\frac{\theta}{\max_{P:e\in P} \gamma_P}\right)\right)_e \text{ or } \left(\frac{\theta}{\max_{P:e\in P} \gamma_P}\right)^{\frac{1}{\gamma_e}}; \text{ or}$$

$$h_e(\theta) = \frac{1}{\gamma_e} \exp\left(\frac{\log\theta}{\max_{P:e\in P} \gamma_P}\right) \text{ or } \frac{1}{\gamma_e} \theta^{\frac{1}{\max_{P:e\in P} \gamma_P}}.$$

That is, when $U_c(\{\rho(e)\}_{\forall e})$ indicating the network cost is being constructed, different weight values need to be set by considering the weight parameters, and corresponding $h_e(\theta)$ has different forms. If a monotonically increasing subfunction in $U_c(\{\rho(e)\}_{\forall e})$ is the same for p(e) of all links, the subfunction can be replaced with another monotonically increasing subfunction. The weight parameter $\gamma_P > 0$ of the path P may be weighted to $U_c^P(\{\rho(e)\}_{\forall e})$ by using a product method or an exponential method. The weight parameter $\gamma_e > 0$ of the link e may also be weighted to $U_c^e(\{\rho(e)\}_{\forall e})$ by using the product method or the exponential method. Therefore, there are four methods for setting the two weight parameters ($\gamma_P$ and $\gamma_e$): When the product method is used for both parameters, $$h_e(\theta) = \frac{1}{\gamma_e} \frac{\theta}{\max_{P:e\in P} \gamma_P};$$

when the exponential method is used for both parameters, $$h_e(\theta) = \exp\left(\frac{1}{\gamma_e} \frac{\log\theta}{\max_{P:e\in P} \gamma_P}\right) \text{ or } \theta^{\frac{1}{\gamma_e} \frac{1}{\max_{P:e\in P} \gamma_P}};$$

when the product method is used for $\gamma_P$ and the exponential method is used for $$\gamma_e, h_e(\theta) = \exp\left(\frac{1}{\gamma_e} \log\left(\frac{\theta}{\max_{P:e\in P} \gamma_P}\right)\right) \text{ or } \left(\frac{\theta}{\max_{P:e\in P} \gamma_P}\right)^{\frac{1}{\gamma_e}};$$

when the exponential method is used for $\gamma_P$ and the product method is used for $\gamma_e$ $$h_e(\theta) = \frac{1}{\gamma_e} \exp\left(\frac{\log\theta}{\max_{P:e\in P} \gamma_P}\right) \text{ or } \frac{1}{\gamma_e} \theta^{\frac{1}{\max_{P:e\in P} \gamma_P}}.$$

For example, $$U_c(\{\rho(e)\}_{\forall e\in P}) \approx \sum_{P\in P_{ud}} \gamma_P U_c^P(\{\rho(e)\}_{\forall e\in P}),$$

$$U_c^P(\{\rho(e)\}_{\forall e\in P}) \approx \sum_{e\in P} \gamma_e U_c^e(\{\rho(e)\}_{\forall e}),$$

and in this embodiment of the present application, $$h_e(\theta) = \frac{1}{\gamma_e} \frac{\theta}{\max_{P:e\in P} \gamma_P};$$

for example, $$U_c(\{\rho(e)\}_{\forall e\in P}) \approx \sum_{P\in P_{ud}} (U_c^P(\{\rho(e)\}_{\forall e}))^{\gamma_P},$$

$$U_c^P(\{\rho(e)\}_{\forall e}) \approx \sum_{e\in P} \gamma_e U_c^e(\{\rho(e)\}_{\forall e}),$$

and in this embodiment of the present application, $$h_e(\theta) = \exp\left(\frac{1}{\gamma_e} \log\left(\frac{\theta}{\max_{P:e\in P} \gamma_P}\right)\right);$$

for example, $$U_c(\{\rho(e)\}_{\forall e}) \approx \sum_{P\in P_{ud}} \gamma_P U_c^P(\{\rho(e)\}_{\forall e\in P}),$$

$$U_c^P(\{\rho(e)\}_{\forall e\in P}) \approx \sum_{P\in P_{ud}} (U_c^e(\{\rho(e)\}_{\forall e\in P}))^{\gamma_e},$$

and in this embodiment of the present application, $$h_e(\theta) = \exp\left(\frac{1}{\gamma_e} \frac{\log\theta}{\max_{P:e\in P} \gamma_P}\right);$$

for example, $$U_c(\{\rho(e)\}_{\forall e\in P}) \approx \sum_{P\in P_{ud}} (U_c^P(\{\rho(e)\}_{\forall e}))^{\gamma_P},$$

$$U_c^P(\{\rho(e)\}_{\forall e\in P}) \approx \sum_{P\in P_{ud}} (U_c^e(\{\rho(e)\}_{\forall e}))^{\gamma_e},$$

and in this embodiment of the present application, $$h_e(\theta) = \exp\left(\frac{1}{\gamma_e} \frac{\log\theta}{\max\limits_{P:e\in P} \gamma_P}\right).$$

Without loss of generality, $U_c^e(\{\rho(e)\}_{\forall e})$ may be $U_c^e(\{\rho(e)\}_{\forall e}) = \rho(e)$, and can be replaced with another monotonically increasing subfunction, for example, $U_c^e(\{\rho(e)\}_{\forall e}) = \log \rho(e)$.

For the foregoing four cases, the formula (5-11) may be transformed into the formulas (5-12), (5-13), (5-14), and (5-15).

$$\min_{x(P),\theta} \theta \quad (5\text{-}12)$$

where constraint conditions are:

$$\sum_{P:e\in P} x(P) \le \frac{1}{\gamma_e} \frac{\theta}{\max\limits_{P:e\in P}\gamma_P}(c(e)-g(e)) \quad \forall\, e \in E \quad (5\text{-}13)$$

$$\sum_{P\in P_{ud}} x(P) = I_{ud} \quad \forall\, u \in C,\, d \in N$$

$$x(P) \ge 0 \quad \forall\, P$$

$$\min_{x(P),\theta}$$

where constraint conditions are:

$$\sum_{P:e\in P} x(P) \le \left(\frac{\theta}{\max\limits_{P:e\in P}\gamma_P}\right)^{\frac{1}{\gamma_e}}(c(e)-g(e)) \quad \forall\, e \in E \quad (5\text{-}14)$$

$$\sum_{P\in P_{ud}} x(P) = I_{ud} \quad \forall\, u \in C,\, d \in N$$

$$x(P) \ge 0 \quad \forall\, P$$

$$\min_{x(P),\theta}$$

where constraint conditions are:

$$\sum_{P:e\in P} x(P) \le \frac{1}{\gamma_e} \theta^{\frac{1}{\max_{P:e\in P}\gamma_P}}(c(e)-g(e)) \quad \forall\, e \in E \quad (5\text{-}15)$$

$$\sum_{P\in P_{ud}} x(P) = I_{ud} \quad \forall\, u \in C,\, d \in N$$

$$x(P) \ge 0 \quad \forall\, P$$

$$\min_{x(P),\theta}$$

where constraint conditions are:

$$\sum_{P:e\in P} x(P) \le \theta^{\frac{1}{\gamma_e} \frac{1}{\max_{P:e\in P}\gamma_P}}(c(e)-g(e)) \quad \forall\, e \in E$$

$$\sum_{P\in P_{ud}} x(P) = I_{ud} \quad \forall\, u \in C,\, d \in N$$

$$x(P) \ge 0 \quad \forall\, P.$$

With reference to the first aspect and the foregoing implementations of the first aspect, in another implementation of the first aspect, the minimizing, by the controller, a cost of all paths in the communications network according to the parameter information includes: minimizing, by the controller, a network cost of the communications network according to a formula (5-21):

$$\min_{x(P),\theta} \theta \quad (5\text{-}21)$$

where constraint conditions are:

$$\sum_{P:e\in P} x(P) \le (c(e)-g(e)) \quad \forall\, e \in E$$

$$\sum_{P:e\in P} x(P) \ge h_e(\theta)(c(e)-g(e)) \quad \forall\, e \in E$$

$$\sum_{P\in P_{ud}} x(P) = I_{ud} \quad \forall\, u \in C,\, d \in N$$

$$x(P) \ge 0 \quad \forall\, P$$

$$0 \le h_e(\theta) \le 1$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $\lambda$ indicates a maximum network throughput proportion, $$\sum_{P\in P_{ud}} x(P)$$

indicates total traffic of all feasible paths from u to d, $\theta$ indicates a parameter related to link balance, $h_e(\theta)$ indicates a relation function of weight parameters and $\theta$, the weight parameters include $\gamma_e$ and $\gamma_P$, $\gamma_e$ indicates a weight parameter of the link e, $\gamma_P$ indicates a weight parameter of the path P, c(e) indicates total bandwidth of the link e, g(e) indicates uncontrollable traffic of the link e, and $$\sum_{P:e\in P} x(P)$$

indicates total controllable traffic of all feasible paths on the link e; and $h_e(\theta)$ may be any one of the following according to different weight values of the weight parameters $\gamma_e$ and $\gamma_P$:

$$h_e(\theta) = \frac{\gamma_e \max\limits_{P:e\in P}\gamma_P}{\theta};\ h_e(\theta) = \exp\left(-\frac{1}{\gamma_e}\frac{\log\theta}{\max\limits_{P:e\in P}\gamma_P}\right)\ \text{or}\ \theta^{-\frac{1}{\gamma_e}\frac{1}{\max_{P:e\in P}\gamma_P}};$$

$$h_e(\theta) = \exp\left(-\frac{1}{\gamma_e}\log\left(\frac{\theta}{\max_{P:e\in P}\gamma_P}\right)\right) \text{ or } \left(\frac{\theta}{\max_{P:e\in P}\gamma_P}\right)^{-\frac{1}{\gamma_e}}; \text{ or}$$

$$h_e(\theta) = \gamma_e\exp\left(-\frac{\log\theta}{\max_{P:e\in P}\gamma_P}\right) \text{ or } \gamma_e\theta^{-\frac{1}{\max_{P:e\in P}\gamma_P}}.$$

That is, when $U_c(\{\rho(e)\}_{\forall e})$ indicating the network cost is being constructed, different weight values need to be set by considering the weight parameters, and corresponding $h_e(\theta)$ has different forms. If a monotonically increasing subfunction in $U_c(\{\rho(e)\}_{\forall e})$ is the same for $\rho(e)$ of all links, the subfunction can be replaced with another monotonically increasing subfunction. The weight parameter $\gamma_P>0$ of the path P may be weighted to $U_c^P(\{\rho(e)\}_{\forall e})$ by using a product method or an exponential method. The weight parameter $\gamma_e>0$ of the link e may also be weighted to $U_c^e(\{\rho(e)\}_{\forall e})$ by using the product method or the exponential method. Therefore, there are four methods for setting the two weight parameters ($\gamma_P$ and $\gamma_e$): When the product method is used for both parameters, $$h_e(\theta) = \frac{\gamma_e\max_{P:e\in P}\gamma_P}{\theta};$$

when the exponential method is used for both parameters, $$h_e(\theta) = \exp\left(-\frac{1}{\gamma_e}\frac{\log\theta}{\max_{P:e\in P}\gamma_P}\right) \text{ or } \theta^{-\frac{1}{\gamma_e}\frac{1}{\max_{P:e\in P}\gamma_P}};$$

when the product method is used for $\gamma_P$ and the exponential method is used for $\gamma_e$ $$h_e(\theta) = \exp\left(-\frac{1}{\gamma_e}\log\left(\frac{\theta}{\max_{P:e\in P}\gamma_P}\right)\right) \text{ or } \left(\frac{\theta}{\max_{P:e\in P}\gamma_P}\right)^{-\frac{1}{\gamma_e}};$$

when the exponential method is used for $\gamma_P$ and the product method is used for $\gamma_e$ $$h_e(\theta) = \gamma_e\exp\left(-\frac{\log\theta}{\max_{P:e\in P}\gamma_P}\right) \text{ or } \gamma_e\theta^{-\frac{1}{\max_{P:e\in P}\gamma_P}}.$$

For example, $$U_c(\{\rho(e)\}_{\forall e\in P}) \approx \sum_{P\in P_{ud}}\gamma_P U_c^P(\{\rho(e)\}_{\forall e\in P}),$$

$$U_c^P(\{\rho(e)\}_{\forall e\in P}) \approx \sum_{e\in P}\gamma_e U_c^e(\{\rho(e)\}_{\forall e}),$$

and in this embodiment of the present application, $$h_e(\theta) = \frac{\gamma_e\max_{P:e\in P}\gamma_P}{\theta};$$

for example, $$U_c(\{\rho(e)\}_{\forall e\in P}) \approx \sum_{P\in P_{ud}}(U_c^P(\{\rho(e)\}_{\forall e}))^{\gamma_P},$$

$$U_c^P(\{\rho(e)\}_{\forall e}) \approx \sum_{e\in P}\gamma_e U_c^e(\{\rho(e)\}_{\forall e}),$$

and in this embodiment of the present application, $$h_e(\theta) = \gamma_e\theta^{-\frac{1}{\max_{P:e\in P}\gamma_P}};$$

for example, $$U_c(\{\rho(e)\}_{\forall e}) \approx \sum_{P\in P_{ud}}\gamma_P U_c^P(\{\rho(e)\}_{\forall e\in P}),$$

$$U_c^P(\{\rho(e)\}_{\forall e\in P}) \approx \sum_{P\in P_{ud}}(U_c^e(\{\rho(e)\}_{\forall e\in P}))^{\gamma_e},$$

and in this embodiment of the present application, $$h_e(\theta) = \left(\frac{\theta}{\max_{P:e\in P}\gamma_P}\right)^{-\frac{1}{\gamma_e}};$$

for example, $$U_c(\{\rho(e)\}_{\forall e\in P}) \approx \sum_{P\in P_{ud}}(U_c^P(\{\rho(e)\}_{\forall e}))^{\gamma_P},$$

$$U_c^P(\{\rho(e)\}_{\forall e\in P}) \approx \sum_{P\in P_{ud}}(U_c^e(\{\rho(e)\}_{\forall e}))^{\gamma_e},$$

and in this embodiment of the present application, $$h_e(\theta) = \theta^{-\frac{1}{\gamma_e}\frac{1}{\max_{P:e\in P}\gamma_P}}.$$

Without loss of generality, $U_c^e(\{\rho(e)\}_{\forall e})$ may be $U_c^e(\{\rho(e)\}_{\forall e})=1/\rho(e)$, and can be replaced with another monotonically increasing subfunction, for example, $U_c^e(\{\rho(e)\}_{\forall e})=\exp(1/\rho(e))$.

For the foregoing four cases, the formula (5-21) may be transformed into the formulas (5-22), (5-23), (5-24), and (5-25).

$$\min_{x(P),\theta}\theta \qquad (5\text{-}22)$$

where constraint conditions are:

$$\sum_{P:e\in P} x(P) \le (c(e) - g(e)) \quad \forall\, e \in E \qquad (5\text{-}23)$$

$$\sum_{P:e\in P} x(P) \ge \frac{\gamma_e \max_{P:e\in P} \gamma_P}{\theta} (c(e) - g(e)) \quad \forall\, e \in E$$

$$\sum_{P\in P_{ud}} x(P) = I_{ud} \quad \forall\, u \in C,\, d \in N$$

$$x(P) \ge 0 \quad \forall\, P$$

$$\gamma_e \max_{P:e\in P} \gamma_P \le \theta$$

$$\min_{x(P),\theta} \theta$$

where constraint conditions are:

$$\sum_{P:e\in P} x(P) \le (c(e) - g(e)) \quad \forall\, e \in E \qquad (5\text{-}24)$$

$$\sum_{P:e\in P} x(P) \ge \left(\frac{\theta}{\max_{P:e\in P}\gamma_P}\right)^{-\frac{1}{\gamma_e}} (c(e) - g(e)) \quad \forall\, e \in E$$

$$\sum_{P\in P_{ud}} x(P) = I_{ud} \quad \forall\, u \in C,\, d \in N$$

$$x(P) \ge 0 \quad \forall\, P$$

$$\max_{P:e\in P} \gamma_P \le \theta$$

$$\min_{x(P),\theta} \theta$$

where constraint conditions are:

$$\sum_{P:e\in P} x(P) \le (c(e) - g(e)) \quad \forall\, e \in E \qquad (5\text{-}25)$$

$$\sum_{P:e\in P} x(P) \ge \gamma_e \theta^{-\frac{1}{\max P:e\in P\gamma_P}} (c(e) - g(e)) \quad \forall\, e \in E$$

$$\sum_{P\in P_{ud}} x(P) = I_{ud} \quad \forall\, u \in C,\, d \in N$$

$$x(P) \ge 0 \quad \forall\, P$$

$$\gamma_e^{\max P:e\in P\gamma_P} \le \theta$$

$$\min_{x(P),\theta} \theta$$

where constraint conditions are:

$$\sum_{P:e\in P} x(P) \le (c(e) - g(e)) \quad \forall\, e \in E$$

$$\sum_{P:e\in P} x(P) \ge \gamma_e \theta^{-\frac{1}{\gamma_e}\frac{1}{\max P:e\in P\gamma_P}} (c(e) - g(e)) \quad \forall\, e \in E$$

$$\sum_{P\in P_{ud}} x(P) = I_{ud} \quad \forall\, u \in C,\, d \in N$$

$$x(P) \ge 0 \quad \forall\, P$$

$$1 \le \theta$$

With reference to the first aspect and the foregoing implementations of the first aspect, in another implementation of the first aspect, the minimizing, by the controller, a cost of all paths in the communications network according to the parameter information includes: minimizing, by the controller, a network cost of the communications network according to a formula (6-11):

$$\max_{x(P),\lambda} \lambda \qquad (6\text{-}11)$$

where constraint conditions are:

$$\sum_{P:e\in P} x(P) \le k_e(\lambda)(c(e) - g(e)) \quad \forall\, e \in E$$

$$\sum_{P\in P_{ud}} x(P) \ge \lambda I_{ud} \quad \forall\, u \in C,\, d \in N$$

$$x(P) \ge 0 \quad \forall\, P$$

$$0 \le k_e(\lambda) \le \lambda$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P\in P_{ud}} x(P)$$

indicates total traffic of all feasible paths from u to d, $\lambda$ indicates a parameter related to a maximum network throughput, $k_e(\lambda)$ indicates a correspondence between a weight parameter of the link e and $\lambda$, $$k_e(\lambda) = \lambda h_e\left(\frac{1}{\lambda}\right),$$

ρ(e) indicates controllable bandwidth utilization of the link e, c(e) indicates total bandwidth of the link e, g(e) indicates uncontrollable traffic of the link e, and $$\sum_{P:e\in P} x(P)$$

indicates total controllable traffic of all feasible paths on the link e.

With reference to the first aspect and the foregoing implementations of the first aspect, in another implementation of the first aspect, the minimizing, by the controller, a network cost of the communications network according to a formula (6-11) includes:

using, by the controller, $k_e(\lambda)$ as a constant, and using a fractional maximum concurrent flow algorithm that has low complexity to solve the formula (6-11), so as to minimize the network cost of the communications network.

That is, the controller may consider $k_e(\lambda)$ in the formula (6-11) as a constant (that is, a current iterative parameter), and use the fractional maximum concurrent flow algorithm that has low complexity to minimize the network cost of the communications network. A short-term link cost in the fractional maximum concurrent flow algorithm is related to the current iterative parameter, for example, a short-term link cost is proportional to or positively correlated with link utilization.

With reference to the first aspect and the foregoing implementations of the first aspect, in another implementation of the first aspect, the minimizing, by the controller, a cost of all paths in the communications network according to the parameter information includes: minimizing, by the controller, a maximum cost of all paths in the communications network according to a formula (6-12):

$$\max_{x(P),\lambda} \lambda \quad (6\text{-}12)$$

where constraint conditions are:

$$\sum_{P:e\in P} x(P) \leq k_e(\lambda)(c(e) - g(e)) \quad \forall\, e \in E$$

$$\sum_{P\in P_{ud}} x(P) \geq \lambda I_{ud} \quad \forall\, u \in C, d \in N$$

$$x(P) \geq 0 \quad \forall\, P$$

$$0 \leq k_e(\lambda) \leq \lambda$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P\in P_{ud}} x(P)$$

indicates total traffic of all feasible paths from u to d, $\lambda$ indicates a parameter related to a maximum network throughput, $k_e(\lambda)$ indicates a correspondence between a weight parameter of the link e and $\lambda$, $\gamma_e$ indicates the weight parameter of the link, $\rho(e)$ indicates controllable bandwidth utilization of the link e, c(e) indicates total bandwidth of the link e, g(e) indicates uncontrollable traffic of the link e, $$\sum_{P:e\in P} x(P)$$

indicates total controllable traffic of all feasible paths on the link e, and $k_e(\lambda)$ may be any one of the following according to different weight values of the weight parameter $\gamma_e$:

$$k_e(\lambda) = \frac{1}{\gamma_e}; \text{ or } k_e(\lambda) = \lambda^{1-\frac{1}{\gamma_e}}.$$

With reference to the first aspect and the foregoing implementations of the first aspect, in another implementation of the first aspect, the minimizing, by the controller, a network cost of the communications network according to a formula (6-12) includes:

using, by the controller, $k_e(\lambda)$ as a constant, and using a fractional maximum concurrent flow algorithm that has low complexity to solve the formula (6-12), so as to minimize the maximum cost of all paths in the communications network.

That is, the controller may consider $k_e(\lambda)$ in the formula (6-12) as a constant (that is, a current iterative parameter), and use the fractional maximum concurrent flow algorithm that has low complexity to minimize the network cost of the communications network. A short-term link cost in the fractional maximum concurrent flow algorithm is related to the current iterative parameter, for example, a short-term link cost is proportional to or positively correlated with link utilization.

With reference to the first aspect and the foregoing implementations of the first aspect, in another implementation of the first aspect, the minimizing, by the controller, a cost of all paths in the communications network according to the parameter information includes: minimizing, by the controller, a network cost of the communications network according to a formula (6-21):

$$\max_{x(P),\lambda} \lambda \quad (6\text{-}21)$$

where constraint conditions are:

$$\sum_{P:e\in P} x(P) \leq (c(e) - g(e)) \quad \forall\, e \in E$$

$$\sum_{P:e\in P} x(P) \geq k_e(\lambda)(c(e) - g(e)) \quad \forall\, e \in E$$

$$\sum_{P\in P_{ud}} x(P) = I_{ud} \quad \forall\, u \in C, d \in N$$

$$x(P) \geq 0 \quad \forall\, P$$

$$0 \leq k_e(\lambda) \leq \lambda$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $\lambda$ indicates a parameter related to a network throughput in a balanced network, $$\sum_{P\in P_{ud}} x(P)$$

indicates total traffic of all feasible paths from u to d, $k_e(\lambda)$ indicates a correspondence between a weight parameter of the link e and $\lambda$, $$k_e(\lambda) = h_e\!\left(\frac{1}{\lambda}\right).$$

weight parameters include $\gamma_e$ and $\gamma_P$, $\gamma_e$ indicates the weight parameter of the link, $\gamma_P$ indicates a weight parameter of the path, $\rho(e)$ indicates controllable bandwidth utilization of the link e, c(e) indicates total bandwidth of the link e, g(e) indicates uncontrollable traffic of the link e, and $$\sum_{P:e \in P} x(P)$$

indicates total controllable traffic of all feasible paths on the link e.

With reference to the first aspect and the foregoing implementations of the first aspect, in another implementation of the first aspect, the minimizing, by the controller, a network cost of the communications network according to a formula (6-21) includes:

using, by the controller, $k_e(\lambda)$ as a constant, and using a fractional maximum concurrent flow algorithm (Fractional Maximum Concurrent Flow) that has low complexity to solve the formula (6-21), so as to minimize the network cost of the communications network.

That is, the controller may consider $k_e(\lambda)$ in the formula (6-21) as a constant (that is, a current iterative parameter), and use the fractional maximum concurrent flow algorithm that has low complexity to minimize the network cost of the communications network. A short-term link cost in the fractional maximum concurrent flow algorithm is related to the current iterative parameter, for example, a short-term link cost is proportional to or positively correlated with link utilization.

With reference to the first aspect and the foregoing implementations of the first aspect, in another implementation of the first aspect, the minimizing, by the controller, a cost of all paths in the communications network according to the parameter information includes: minimizing, by the controller, a maximum cost of all paths in the communications network according to a formula (6-22):

$$\max_{x(P),\lambda} \lambda \quad (6\text{-}22)$$

where constraint conditions are:

$$\sum_{P:e \in P} x(P) \le (c(e) - g(e)) \forall\, e \in E$$

$$\sum_{P:e \in P} x(P) \ge k_e(\lambda)(c(e) - g(e)) \forall\, e \in E$$

$$\sum_{P \in P_{ud}} x(P) = I_{ud} \forall\, u \in C,\, d \in N$$

$$x(P) \ge 0 \forall\, P$$

$$0 \le k_e(\lambda) \le 1$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $\lambda$ indicates a parameter related to a network throughput in a balanced network, $$\sum_{P \in P_{ud}} x(P)$$

indicates total traffic of all feasible paths from u to d, $k_e(\lambda)$ indicates a correspondence between a weight parameter of the link e and $\lambda$, weight parameters include $\gamma_e$ and $\gamma_P$, $\gamma_e$ indicates the weight parameter of the link, $\gamma_P$ indicates a weight parameter of the path, $\rho(e)$ indicates controllable bandwidth utilization of the link e, c(e) indicates total bandwidth of the link e, g(e) indicates uncontrollable traffic of the link e, $$\sum_{P:e \in P} x(P)$$

indicates total controllable traffic of all feasible paths on the link e, and $k_e(\lambda)$ may be any one of the following according to different weight values of the weight parameter $\gamma_e$.

$$k_e(\lambda) = \gamma_e \lambda;\ \text{or}\ k_e(\lambda) = \lambda^{\frac{1}{\gamma_e}}.$$

With reference to the first aspect and the foregoing implementations of the first aspect, in another implementation of the first aspect, the minimizing, by the controller, a network cost of the communications network according to a formula (6-22) includes:

using, by the controller, $k_e(\lambda)$ as a constant, and using an improved fractional maximum concurrent flow algorithm to solve the formula (6-22), so as to minimize the network cost of the communications network.

That is, the controller considers $k_e(\lambda)$ in the formula (6-22) as a constant (that is, a current iterative parameter), and uses a revised fractional maximum concurrent flow algorithm (that is, considers a short-term link cost in an original fractional maximum concurrent flow algorithm as a positive value, and based on this, sets a new short-term link cost related to the current iterative parameter, and considers the new short-term link cost as a negative value) to minimize the network cost of the communications network.

Therefore, according to the foregoing solution, in this embodiment of the present application, fast TE control can be implemented, and an algorithm that has low complexity can be used to resolve a problem of existing TE control that is considered to have high complexity in the prior art. That is, in this embodiment of the present application, a more general TE control problem is raised and resolved, so that real-time TE can be implemented.

According to a second aspect, a controller in a communications network is provided, where the controller can implement any one of the first aspect or the implementations of the first aspect, and an operation and/or a function of each module in the controller is used to implement a corresponding method feature in the first aspect and the implementations of the first aspect. For brevity, details are not described herein again.

According to a third aspect, a controller in a communications network is provided, where the controller includes a memory that stores an instruction and a processor, and the processor executes the instruction to perform the method for traffic engineering in a communications network according to any one of the first aspect or the implementations of the first aspect.

According to a fourth aspect, a processing apparatus is provided, where the processing apparatus is applied to a communications system. The processing apparatus may be one or more processors or chips. In another possible case, the processing apparatus may alternatively be a physical apparatus or a virtual apparatus in the communications system. The processing apparatus is configured to perform the method for traffic engineering in a communications network according to any one of the first aspect or the implementations of the first aspect.

According to a fifth aspect, a computer program product is provided, where the computer program product includes computer program code, and when the computer program code is run by a computation unit, a processing unit, or a processor of a communications device, the communications device performs the method for traffic engineering in a communications network according to any one of the first aspect or the implementations of the first aspect.

According to a sixth aspect, a computer-readable storage medium is provided, where the computer-readable storage medium stores a program, and the program enables a communications device to perform the method for traffic engineering in a communications network according to any one of the first aspect or the implementations of the first aspect.

Based on the foregoing technical solutions, in the embodiments of the present application, traffic sampling is performed at the temporal frequency by the determined at least one sampling node. The controller instructs the at least one sampling node to sample data at the temporal frequency, and receives the sampled traffic data that is of all sampling nodes and that is obtained during each sampling; determines, according to the sampled traffic data, the parameter information required for traffic engineering; and finally performs traffic engineering control according to the parameter information. TE control based on partial measurement is implemented.

DESCRIPTION OF EMBODIMENTS

The following clearly describes the technical solutions in the embodiments of the present application with reference to the accompanying drawings in the embodiments of the present application.

It should be understood that the embodiments of the present application may be applied to various communications network (particularly to network layers of communications systems), for example, an IP network, a Multiprotocol Label Switching based network (MPLS-based network), an ad-hoc network, an information centric network, a content delivery network, and an SDN. In addition, it should be understood that the technical solutions in the embodiments of the present application are compatible with technologies of various communications systems (particularly with access layers of the communications systems) (that is, do not rely on a technology of a specific communications system). For example, the technical solutions are compatible with technologies of the following communications systems: different wireless communications systems, including a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE Frequency Division Duplex (FDD) system, an LTE Time Division Duplex (TDD) system, a Universal Mobile Telecommunications System (UMTS), or a Worldwide Interoperability for Microwave Access (WiMAX) communications system, and a fixed line network (fixed network for short). The following uses only the SDN network (and a fixed network technology) as an example for detailed description.

Figure 1:
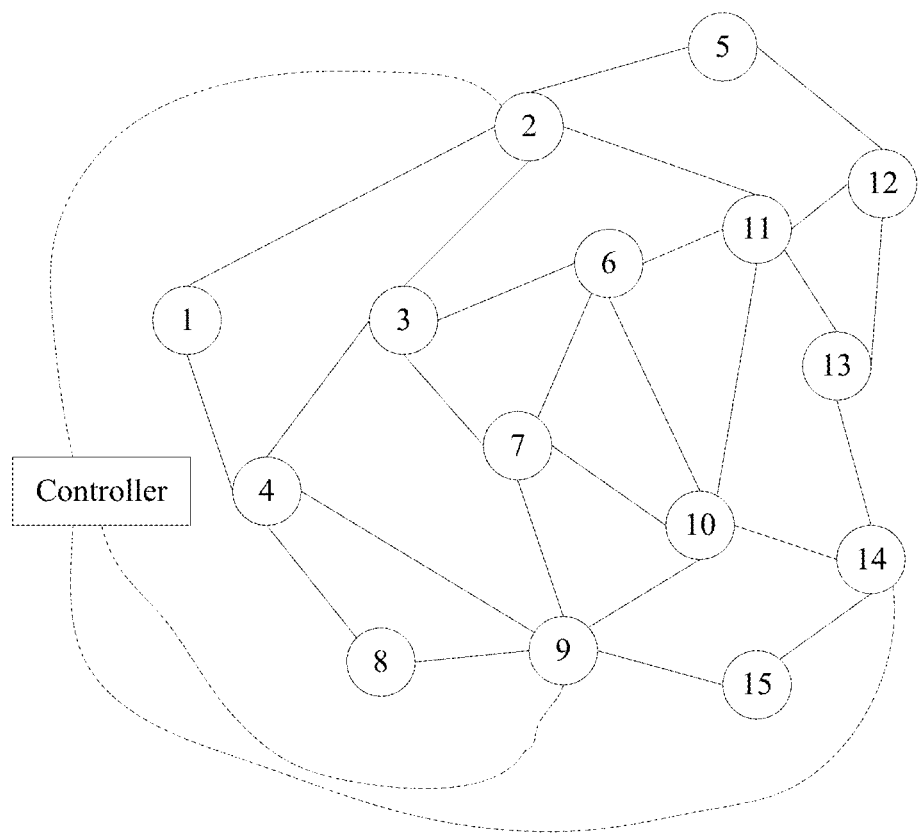
FIG. 1 is a schematic diagram of a usable SDN network system according to an embodiment of the present application.

FIG. 1 is a schematic diagram of a usable SDN network system according to an embodiment of the present application. An SDN network architecture shown in FIG. 1 includes a controller and nodes 1 to 15, where nodes 2, 9, and 14 are directly connected to the controller and are flexible nodes; and nodes 1, 3, 4, 5, 6, 7, 8, 10, 11, 12, 13, and 15 are indirectly connected to the controller and are non-flexible nodes.

The following first defines some terms and symbols of TE-related traffic data in the embodiments of the present application with reference to a scenario in FIG. 1.

In FIG. 1, the SDN network may be modeled as a graph G=(N, E), where N indicates a set of all nodes, and E indicates a set of all links. There is a subset C in the set N. A node in the subset C is referred to as an SDN forwarding device (SDN-FE; that is, a flexible node or a class 1 node), and the node is directly connected to an SDN controller (SDN-C). Other nodes are all referred to as non-flexible nodes or class 2 nodes, and form a set referred to as D. That is, a set of flexible nodes is C, and a set of non-flexible nodes is D. In FIG. 1, digits on the nodes represent node numbers. The set N includes all nodes, that is, node 1 to node 15. The set C includes three nodes: {2, 9, 14}. The set D includes {1, 3, 4, 5, 6, 7, 8, 10, 11, 12, 13, 15}.

Traffic that goes from a source node to a destination node and does not pass through a flexible node is referred to as uncontrollable traffic.

Another service needs to pass through at least one flexible node (or start from a flexible node (that is, the flexible node is a source node of the service)). Because of controllability of the flexible node, such a service is referred to as controllable traffic.

For each link e, total traffic is denoted as f(e), and uncontrollable traffic is denoted as g(e).

$T_{sd}$ indicates total traffic from a source node s in N to a destination node in N.

$W_{ud}$ indicates total traffic that passes through or starts from a node u in C and goes to a destination node d in N.

$I_{ud}$ indicates total traffic injected from the node u in C to the destination node d in N.

According to the foregoing definitions, it is certain that $W_{ud} \geq T_{ud}$.

Figure 2:
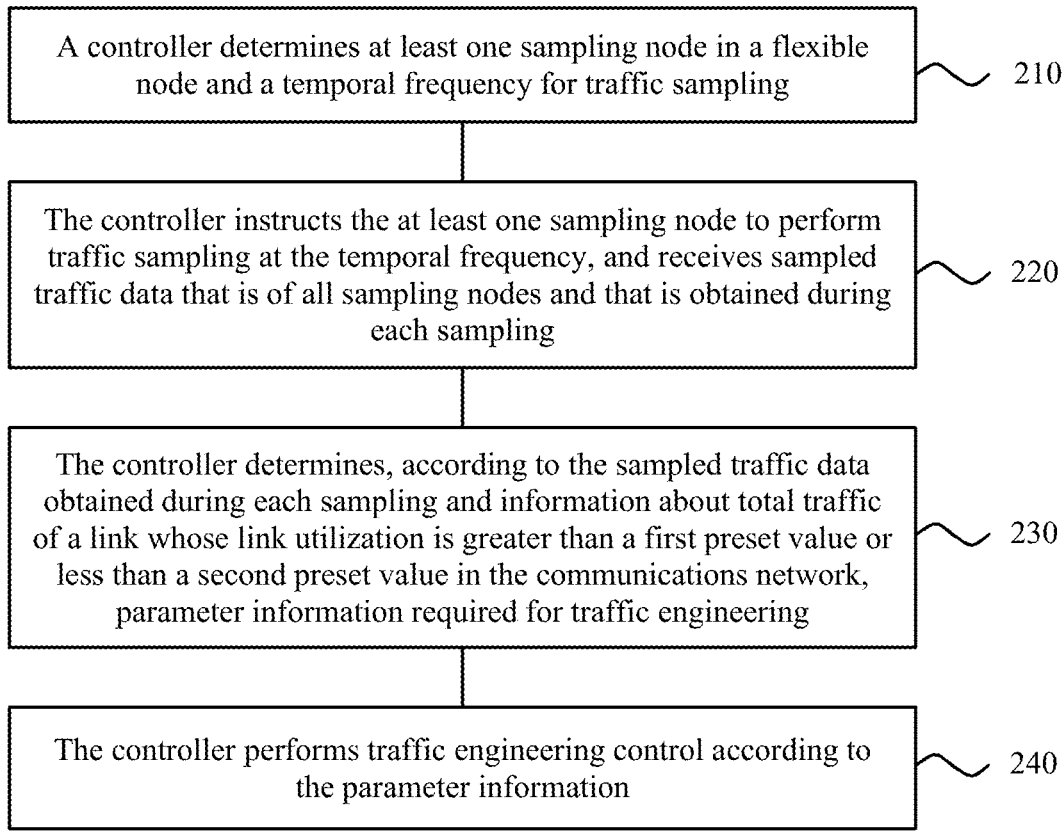
FIG. 2 is a schematic flowchart of a method for traffic engineering in a communications network according to an embodiment of the present application.

FIG. 2 is a method for traffic engineering in a communications network according to an embodiment of the present application. The communications network may be the SDN network in FIG. 1. This embodiment of the present application is not limited thereto. The communications network includes a controller and multiple nodes. The multiple nodes include a flexible node and a non-flexible node. The flexible node is directly connected to the controller, and the non-flexible node is indirectly connected to the controller. The method may be performed by the controller. The method includes:

210. The controller determines at least one sampling node in the flexible node and a temporal frequency for traffic sampling.

220. The controller instructs the at least one sampling node to perform traffic sampling at the temporal frequency, and receives sampled traffic data that is of all sampling nodes and that is obtained during each sampling.

230. The controller determines, according to the sampled traffic data obtained during each sampling and information about total traffic of a link whose link utilization is greater than a first preset value or less than a second preset value in the communications network, parameter information required for traffic engineering.

240. The controller performs traffic engineering control according to the parameter information.

Therefore, in this embodiment of the present application, traffic sampling is performed at the temporal frequency by the determined at least one sampling node. The controller instructs the at least one sampling node to sample data at the temporal frequency, and receives the sampled traffic data that is of all sampling nodes and that is obtained during each sampling; determines, according to the sampled traffic data, the parameter information required for traffic engineering; and finally performs traffic engineering control according to the parameter information. High-efficiency and high-performance TE control is implemented based on partial measurement.

It should be understood that the first preset value is greater than the second preset value. The sampled traffic data includes service traffic that passes through or starts from each sampling node in the communications network and goes to each destination node in the communications network.

It should be understood that, in step 220, the controller may instruct the sampling node in an existing manner, for example, in a flow table delivery manner. This is not limited in this embodiment of the present application. Alternatively, the controller may obtain, in an existing manner, the sampled data sent by the sampling node. This is not limited in this embodiment of the present application.

Optionally, in another embodiment, in step 210, the controller determines, according to estimated total traffic of a service in the communications network, the at least one sampling node and the temporal frequency for traffic sampling.

Further, in another embodiment, in step 210, the controller determines a quantity of the at least one sampling node and the temporal frequency according to the following formulas:

$$|C_s|=\gamma_{11}|C|$$

$$V*T_s=\gamma_{12}\log(|C_s|)$$

or $$|C_s|=\log(\gamma_{21}|C|)$$

$$V*T_s=\gamma_{22}|C_s|,$$

where $|C_s|$ indicates the quantity of sampling nodes, $T_s$ indicates the sampling frequency, V indicates the estimated total traffic, C indicates a set of flexible nodes in the communications network, $|C|$ indicates a quantity of flexible nodes in the communications network, $\gamma_{11}$, $\gamma_{12}$, $\gamma_{21}$, and $\gamma_{22}$ are preset constant parameters, $0<\gamma_{11}<1$, and $0<\log(\gamma_{21}|C|)<|C|$; and after determining the quantity of sampling nodes, the controller randomly selects $|C_s|$ nodes from the set of flexible nodes, and uses the $|C_s|$ nodes as a set of the sampling nodes.

It should be understood that, in this embodiment of the present application, a random probability is not limited, for example, an equal probability may be available, the probability may be determined according to a quantity of historical node access times, or the probability may be determined according to a node degree. This is not limited in this embodiment of the present application.

Alternatively, the controller determines a quantity of the at least one sampling node and the temporal frequency for each destination node d according to the following formulas:

$$|C_s^d|=\gamma_{11}^d|C|$$

$$V^d*T_s^d=\gamma_{12}^d\log(|C_s^d|)$$

or $$|C_s^d|=\log(\gamma_{21}^d|C|)$$

$$V^d*T_s^d=\gamma_{22}^d|C_s^d|,$$

where $|C_s^d|$ indicates a quantity of sampling nodes corresponding to the destination node d, $T_s^d$ indicates a sampling frequency corresponding to the destination node d, $V^d$ indicates estimated total traffic to the destination node d, C indicates a set of flexible nodes in the communications network, $|C|$ indicates a quantity of flexible nodes in the communications network, $\gamma_{11}^d$, $\gamma_{12}^d$, $\gamma_{21}^d$, and $\gamma_{22}^d$ are preset constant parameters, $0<\gamma_{11}^d<1$, and $0<\log(\gamma_{21}^d|C|)<|C|$.

The controller selects, for each destination node d, $|C_s^d|$ nodes in a path in a directed acyclic graph (DAG) that is pre-generated based on a topology of flexible nodes and uses the $|C_s^d|$ nodes as a set of the sampling nodes, or randomly selects $|C_s^d|$ nodes from the set of flexible nodes and uses the $|C_s^d|$ nodes as a set of the sampling nodes.

For example, each selected sampling node is selected from an independent path in the DAG For example, $|C_s^d|$ common nodes are selected from a common DAG portion of all destination nodes d. That is, the destination nodes d may have a same DAG graph, or may have different DAG graphs. This embodiment of the present application is not limited thereto.

Optionally, in another embodiment, the parameter information required for traffic engineering includes injected service traffic from each flexible node to each destination node in the communications network and uncontrollable service traffic in a link whose link utilization is greater than a preset value in the communications network.

In step 230, the controller determines, according to the following formula (1), the parameter information required for traffic engineering.

$$\text{Min}_{\Delta I}||\text{vec}(\Delta I)_{l_0} \tag{1}$$

where constraint conditions are:

$$W_{wd}=\sum_{u\leq w}\beta_w(u,d)I_{ud}$$

-continued $$I_{current} = I_{ud} = \Delta I + I_{last\ iteration}$$

$$g(e) = f(e) - \sum_{u \in C}\sum_{d \in N} \alpha_e(u,d)I_{ud}, \forall e \in E$$

where E indicates a set of all links in the communications network, N indicates a set of all nodes in the communications network, and C indicates a set of all flexible nodes in the communications network;

w indicates a sampling node, u indicates a flexible node, d indicates a destination node, $\Delta I$ indicates a difference between injected traffic $I_{last\ iteration}$ of the flexible node u that is obtained during previous sampling and injected traffic $I_{ud}$ of the flexible node u that is obtained during current sampling, and vec($\Delta I$) indicates that all elements $\Delta I$ (for all flexible nodes u) are combined as a vector; $Min_{\Delta I}\|vec(\Delta I)\|^{l_0}$ indicates a minimum $l_0$ norm of vec($\Delta I$), e indicates a link whose link utilization is greater than the first preset value or a link whose link utilization is less than the second preset value in the communications network, f(e) indicates total traffic of the link e, g(e) indicates uncontrollable service traffic in the link e, $W_{wd}$ indicates service traffic that passes through or starts from the sampling node w in the communications network and goes to the node d in the communications network, and $I_{ud}$ indicates injected service traffic from the flexible node u to the destination node d; and $\alpha_e(u,d)$ indicates a total fraction of a packet that is transmitted from the node u to the destination d and passes through the link e, $\beta_w(u,d)$ indicates a total fraction of a packet that is transmitted from the node u to the destination d and passes through the sampling node w, and u≤w indicates that w is passed through by a packet transmitted from u.

The foregoing has described solving $l_0$ norm minimization to determine the parameter information required for traffic engineering. In this embodiment of the present application, the parameter information required for traffic engineering may be determined in another alternative manner. For example, the parameter information required for traffic engineering may be determined by solving $l_1$ norm minimization, weighted $l_1$ norm minimization, or $l_p$ norm minimization, where 0<p≤1. Details are separately described below.

Alternatively, in step 230, the controller determines, according to any one of the following formula (2), formula (3), or formula (4), the parameter information required for traffic engineering.

The formula (2) indicates solving $l_1$ norm minimization, that is:

$$\min_{\Delta I}\|vec(\Delta I)\|_{l_1} \quad (2)$$

where constraint conditions are:

$$W_{wd} = \sum_{u \leq w} \beta_w(u,d)I_{ud} \forall w \in C_s, d \in N$$

$$I_{current} = I_{ud} = \Delta I + I_{last\ iteration}$$

$$g(e) = f(e) - \sum_{u \in C}\sum_{d \in N} \alpha_e(u,d)I_{ud}, \forall e \in E$$

where E indicates a set of all links in the communications network, N indicates a set of all flexible nodes in the communications network, and C indicates a set of all flexible nodes in the communications network;

w indicates a sampling node, u indicates a flexible node, d indicates a destination node, $\Delta I$ indicates a difference between injected traffic $I_{last\ iteration}$ of the flexible node u that is obtained during previous sampling and injected traffic $I_{ud}$ of the flexible node u that is obtained during current sampling, and vec($\Delta I$) indicates that all elements $\Delta I$ (for all flexible nodes u) are combined as a vector;

$$\min_{\Delta I}\|vec(\Delta I)\|_{l_1}$$

indicates a minimum $l_1$ norm of vec($\Delta I$);

e indicates a link whose link utilization is greater than the first preset value or a link whose link utilization is less than the second preset value in the communications network, f(e) indicates total traffic of the link e, and g(e) indicates uncontrollable service traffic in the link e;

$W_{wd}$ indicates service traffic that passes through or starts from the sampling node w in the communications network and goes to the node d in the communications network, and $I_{ud}$ indicates injected service traffic from the flexible node u to the destination node d; and $\alpha_e(u,d)$ indicates a total fraction of a packet that is transmitted from the node u to the destination d and passes through the link e, $\beta_w(u,d)$ indicates a total fraction of a packet that is transmitted from the node u to the destination d and passes through the sampling node w, and u≤w indicates that w is passed through by a packet transmitted from u; and $Min_{\Delta I}\|vec(\Delta I)\|_{l_1}$ indicates a minimum $l_1$ norm of vec($\Delta I$).

The formula (3) indicates solving weighted $l_1$ norm minimization, that is:

set an initialized value of a weight m to 1; and repeatedly solve the formula (3) until some (selectable) optimization parameters remain unchanged or almost unchanged, for example, w or $\Delta I$ remains unchanged or almost unchanged.

$$\min_{\Delta I}\|\text{diag}(m)vec(\Delta I)\|_{l_1} \quad (3)$$

where constraint conditions are:

$$W_{wd} = \sum_{u \leq w} \beta_w(u,d)I_{ud} \forall w \in C_s, d \in N$$

$$I_{current} = I_{ud} = \Delta I + I_{last\ iteration}$$

$$g(e) = f(e) - \sum_{u \in C}\sum_{d \in N} \alpha_e(u,d)I_{ud}, \forall e \in E$$

where m indicates a weight, $$m = \frac{1}{\varepsilon + |\Delta I|},$$

an initial value of m is 1, diag(m) indicates a diagonal matrix, and if a $u^{th}$ element of vec($\Delta I$) is $\Delta I$, a $u^{th}$ diagonal element of the diagonal matrix is $$m = \frac{1}{\varepsilon + |\Delta I|}; \text{ and } \min_{\Delta I}\|\text{diag}(m)vec(\Delta I)\|_{l_1}$$

indicates a minimum $l_1$ norm of $\text{diag}(m)vec(\Delta I)$.

The formula (4) indicates solving $l_p$ norm minimization or weighted $l_p$ norm minimization (where $0 < p \le 1$), that is, the $l_1$ norm in the formula (2) or the formula (3) is changed to an $l_p$ norm.

$$\min_{\Delta I}\|vec(\Delta I)\|_{l_p} \quad (4)$$

where constraint conditions are:

$$W_{wd} = \sum_{u \le w} \beta_w(u, d) I_{ud} \forall w \in C_s, d \in N$$

$$I_{current} = I_{ud} = \Delta I + I_{last\ iteration}$$

$$g(e) = f(e) - \sum_{u \in C}\sum_{d \in N} \alpha_e(u, d) I_{ud}, \forall e \in E; \text{ and}$$

$$\min_{\Delta I}\|vec(\Delta I)\|_{l_p}$$

indicates a minimum $l_p$ norm of $vec(\Delta I)$, and $0 < p \le 1$.

It should be understood that, in step 240, an objective of traffic engineering control is to achieve some TE objectives, for example, reducing network congestion, optimizing network utilization, and balancing network load. The controller may reduce maximum link utilization in the communications network to achieve some TE objectives.

Accordingly, in another embodiment, in step 240, the controller minimizes a cost of all paths in the communications network according to the parameter information.

Further, in another embodiment, in step 240, the controller minimizes a network cost of the communications network according to the following formula (5):

$$\min_{x(P)} U_c(\{\rho(e)\}_{\forall e}) \quad (5)$$

where constraint conditions are:

$$\sum_{P \in P_{ud}} x(P) = I_{ud} \forall u \in C, d \in N$$

$$x(P) \ge 0 \forall P$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, and $P_{ud}$ indicates a set of all feasible paths from u to d; it should be noted that an example of a feasible path is based on a conventional method, for example, in the OSPF (Open Shortest Path First) protocol, if u' is a point in a path P and is a conventional node (non-flexible node), a node next to u' in the path P is a next node in a shortest path to d; and another example of a feasible path may be a set of paths customized by a network administrator;

$P \in P_{ud}$ indicates that P is a feasible path in Id, x(P) indicates traffic of the path P, $$\sum_{P \in P_{ud}} x(P)$$

indicates total traffic of all feasible paths from u to d, and $\rho(e)$ indicates controllable bandwidth utilization of the link e, that is, $$\rho(e) \cong \frac{\sum_{P:e \in P} x(P)}{c(e) - g(e)},$$

where c(e) indicates total bandwidth of the link e, g(e) indicates uncontrollable traffic of the link e, and $$\sum_{P:e \in P} x(P)$$

indicates total controllable traffic of all feasible paths on the link e; and $U_c(\{\rho(e)\}_{\forall e})$ indicates the network cost, that is, a function constructed based on controllable bandwidth utilization of all links e, that is, if the controllable bandwidth utilization $\{\rho(e)\}_{\forall e \in P}$ of all links e on the path P is set, $U_c(\{\rho(e)\}_{\forall e \in P})$ may provide a real number indicating the cost, for example, if $$U_c(\{\rho(e)\}_{\forall e}) = \max_e \rho(e),$$

the cost is maximum link utilization in the path.

Alternatively, in another embodiment, the controller minimizes a maximum cost of all paths in the communications network according to the following formula (6):

$$\min_{x(P)} \max_{P \in P_{ud}} U_c^P(\{\rho(e)\}_{\forall e \in P}) \quad (6)$$

where constraint conditions are:

$$\sum_{P \in P_{ud}} x(P) = I_{ud} \forall u \in C, d \in N$$

$$x(P) \ge 0 \forall P$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P \in P_{ud}} x(P)$$

indicates total traffic of all feasible paths from u to d, and ρ(e) indicates controllable bandwidth utilization of the link e, that is, $$\rho(e) \cong \frac{\sum_{P: e \in P_{ud}} x(P)}{c(e) - g(e)},$$

where c(e) indicates total bandwidth of the link e, g(e) indicates uncontrollable traffic of the link e, and $$\sum_{P: e \in P_{ud}} x(P)$$

indicates total controllable traffic of all feasible paths on the link e; and $U_c^P(\{\rho(e)\}_{\forall e})$ indicates a cost of the path P.

It should be understood that, alternatively, the controller minimizes a path cost according to the parameter information and according to a solution or an approximate solution of an equivalent transformation of the formula (5) or the formula (6) and an implementation method thereof, specifically, according to any one of a special example of the formula (5), such as a formula (5-11), a formula (5-12), a formula (5-13), a formula (5-14), a formula (5-15), a formula (5-21), a formula (5-22), a formula (5-23), a formula (5-24), or a formula (5-25), or a special example of the formula (6), such as a formula (6-11), a formula (6-12), a formula (6-21), or a formula (6-22). Details are separately described below.

Alternatively, the controller minimizes a network cost of the communications network according to any one of the following formulas: formula (5-11), formula (5-12), formula (5-13), formula (5-14), or formula (5-15).

Specifically, that the controller minimizes a cost of all paths in the communications network according to the parameter information includes that the controller minimizes the network cost of the communications network according to the formula (5-11):

$$\min_{x(P), \theta} \theta \quad (5\text{-}11)$$

where constraint conditions are:

$$\sum_{P: e \in P} x(P) \le h_e(\theta)(c(e) - g(e)) \forall\, e \in E$$

$$\sum_{P \in P_{ud}} x(P) = I_{ud} \forall\, u \in C, d \in N$$

$$x(P) \ge 0 \forall\, P$$

$$\theta \le h_e(\theta) \le 1$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P \in P_{ud}} x(P)$$

indicates total traffic of all feasible paths from u to d, λ indicates a maximum network throughput proportion, θ indicates a parameter related to maximum link utilization, $h_e(\theta)$ indicates a relation function of weight parameters and θ, the weight parameters include $\gamma_e$ and $\gamma_P$, $\gamma_e$ indicates a weight parameter of the link e, $\gamma_P$ indicates a weight parameter of the path P, c(e) indicates total bandwidth of the link e, g(e) indicates uncontrollable traffic of the link e, and $$\sum_{P: e \in P} x(P)$$

indicates total controllable traffic of all feasible paths on the link e; and $h_e(\theta)$ may be any one of the following according to different weight values of the weight parameters $\gamma_e$ and $\gamma_P$:

$$h_e(\theta) = \frac{1}{\gamma_e} \frac{\theta}{\max_{P:e \in P} \gamma_P}; \quad h_e(\theta) = \exp\left(\frac{1}{\gamma_e} \frac{\log\theta}{\max_{P:e \notin P} \gamma_P}\right) \text{ or } \theta^{\frac{1}{\gamma_e} \frac{1}{\max_{P:e \in P} \gamma_P}};$$

$$h_e(\theta) = \exp\left(\frac{1}{\gamma_e} \log\left(\frac{\theta}{\max_{P:e \in P} \gamma_P}\right)\right) \text{ or } \left(\frac{\theta}{\max_{P:e \in P} \gamma_P}\right)^{\frac{1}{\gamma_e}}; \text{ or}$$

$$h_e(\theta) = \frac{1}{\gamma_e} \exp\left(\frac{\log\theta}{\max_{P:e \in P} \gamma_P}\right) \text{ or } \frac{1}{\gamma_e} \theta^{\frac{1}{\max_{P:e \in P} \gamma_P}}.$$

That is, when $U_c(\{\rho(e)\}_{\forall e})$ indicating the network cost is being constructed, different weight values need to be set by considering the weight parameters, and corresponding $h_e(\theta)$ has different forms. If a monotonically increasing subfunction in $U_c(\{\rho(e)\}_{\forall e})$ is the same for ρ(e) of all links, the subfunction can be replaced with another monotonically increasing subfunction. The weight parameter $\gamma_P > 0$ of the path P may be weighted to $U_c^P(\{\rho(e)\}_{\forall e})$ by using a product method or an exponential method. The weight parameter $\gamma_e > 0$ of the link e may also be weighted to $U_c^e(\{\rho(e)\}_{\forall e})$ by using the product method or the exponential method. Therefore, there are four methods for setting the two weight parameters ($\gamma_P$ and $\gamma_e$): When the product method is used for both parameters, $$h_e(\theta) = \frac{1}{\gamma_e} \frac{\theta}{\max_{P:e \in P} \gamma_P};$$

when the exponential method is used for both parameters, $$h_e(\theta) = \exp\left(\frac{1}{\gamma_e} \frac{\log\theta}{\max_{P:e \in P} \gamma_P}\right) \text{ or } \theta^{\frac{1}{\gamma_e} \frac{1}{\max_{P:e \in P} \gamma_P}};$$

when the product method is used for $\gamma_P$ and the exponential method is used for $\gamma_e$, $$h_e(\theta) = \exp\left(\frac{1}{\gamma_e}\log\left(\frac{\theta}{\max_{P:e\in P}\gamma_P}\right)\right) \text{ or } \left(\frac{\theta}{\max_{P:e\in P}\gamma_P}\right)^{\frac{1}{\gamma_e}};$$

when the exponential method is used for $\gamma_P$ and the product method is used for $\gamma_e$, $$h_e(\theta) = \frac{1}{\gamma_e}\exp\left(\frac{\theta}{\max_{P:e\in P}\gamma_P}\right) \text{ or } \frac{1}{\gamma_e}\theta^{\frac{1}{\max_{P:e\in P}\gamma_P}}.$$

For example, $$U_c(\{\rho(e)\}_{\forall e\in P}) \approx \sum_{P\in P_{ud}} \gamma_P U_c^P(\{\rho(e)\}_{\forall e\in P}),$$

$$U_c^P(\{\rho(e)\}_{\forall e\in P}) \approx \sum_{e\in P} \gamma_e U_c^e(\{\rho(e)\}_{\forall e}),$$

and in this embodiment of the present application, $$h_e(\theta) = \frac{1}{\gamma_e}\frac{\theta}{\max_{P:e\in P}\gamma_P};$$

for example, $$U_c(\{\rho(e)\}_{\forall e\in P}) \approx \sum_{P\in P_{ud}} (U_c^P(\{\rho(e)\}_{\forall e}))^{\gamma_P},$$

$$U_c^P(\{\rho(e)\}_{\forall e}) \approx \sum_{e\in P} \gamma_e U_c^e(\{\rho(e)\}_{\forall e}),$$

and in this embodiment of the present application, $$h_e(\theta) = \exp\left(\frac{1}{\gamma_e}\log\left(\frac{\theta}{\max_{P:e\in P}\gamma_P}\right)\right);$$

for example, $$U_c(\{\rho(e)\}_{\forall e}) \approx \sum_{P\in P_{ud}} \gamma_P U_c^P(\{\rho(e)\}_{\forall e\in P}),$$

$$U_c^P(\{\rho(e)\}_{\forall e\in P}) \approx \sum_{P\in P_{ud}} (U_c^e(\{\rho(e)\}_{\forall e\in P}))^{\gamma_e},$$

and in this embodiment of the present application, $$h_e(\theta) = \exp\left(\frac{1}{\gamma_e}\frac{\log\theta}{\max_{P:e\in P}\gamma_P}\right);$$

for example, $$U_c(\{\rho(e)\}_{\forall e\in P}) \approx \sum_{P\in P_{ud}} (U_c^P(\{\rho(e)\}_{\forall e}))^{\gamma_P},$$

$$U_c^P(\{\rho(e)\}_{\forall e\in P}) \approx \sum_{P\in P_{ud}} (U_c^e(\{\rho(e)\}_{\forall e}))^{\gamma_e},$$

and in this embodiment of the present application, $$h_e(\theta) = \exp\left(\frac{1}{\gamma_e}\frac{\log\theta}{\max_{P:e\in P}\gamma_P}\right).$$

Without loss of generality, $U_c^e(\{\rho(e)\}_{\forall e})$ may be $U_c^e(\{\rho(e)\}_{\forall e})=\rho(e)$, and can be replaced with another monotonically increasing subfunction, for example, $U_c^e(\{\rho(e)\}_{\forall e})=\log \rho(e)$.

For the foregoing four cases, the formula (5-11) may be transformed into the formulas (5-12), (5-13), (5-14), and (5-15).

$$\min_{x(P),\theta} \theta \qquad (5\text{-}12)$$

where constraint conditions are:

$$\sum_{P:e\in P} x(P) \leq \frac{1}{\gamma_e}\frac{\theta}{\max_{P:e\in P}\gamma_P}(c(e)-g(e))\forall\, e\in E \qquad (5\text{-}13)$$

$$\sum_{P\in P_{ud}} x(P) = I_{ud}\forall\, u\in C, d\in N$$

$$x(P) \geq 0\forall\, P$$

$$\min_{x(P),\theta}$$

where constraint conditions are:

$$\sum_{P:e\in P} x(P) \leq \left(\frac{\theta}{\max_{P:e\in P}\gamma_P}\right)^{\frac{1}{\gamma_e}}(c(e)-g(e)) \quad \forall\, e\in E \qquad (5\text{-}14)$$

$$\sum_{P\in P_{ud}} x(P) = I_{ud} \quad \forall\, u\in C, d\in N$$

$$x(P) \geq 0 \quad \forall\, P$$

$$\min_{x(P),\theta} \theta$$

where constraint conditions are:

$$\sum_{P:e\in P} x(P) \leq \frac{1}{\gamma_e}\theta^{\frac{1}{\max_{P:e\in P}\gamma_P}}(c(e)-g(e)) \quad \forall\, e\in E \qquad (5\text{-}15)$$

$$\sum_{P\in P_{ud}} x(P) = I_{ud} \quad \forall\, u\in C, d\in N$$

$$x(P) \geq 0 \quad \forall\, P$$

$$\min_{x(P),\theta} \theta$$

where constraint conditions are:

$$\sum_{P:e\in P} x(P) \leq \theta^{\frac{1}{\gamma_e} \frac{1}{\max_{P:e\in P}\gamma_P}}(c(e)-g(e)) \quad \forall e \in E$$

$$\sum_{P\in P_{ud}} x(P) = I_{ud} \quad \forall u \in C, d \in N$$

$$x(P) \geq 0 \quad \forall P$$

Alternatively, the controller minimizes a network cost of the communications network according to any one of the following formulas: formula (5-21), formula (5-22), formula (5-23), formula (5-24), or formula (5-25).

Specifically, that the controller minimizes a cost of all paths in the communications network according to the parameter information includes that the controller minimizes the network cost of the communications network according to the formula (5-21):

$$\min_{x(P),\theta} \theta \quad (5\text{-}21)$$

where constraint conditions are:

$$\sum_{P:e\in P} x(P) \leq (c(e)-g(e)) \quad \forall e \in E$$

$$\sum_{P:e\in P} x(P) \geq h_e(\theta)(c(e)-g(e)) \quad \forall e \in E$$

$$\sum_{P\in P_{ud}} x(P) = I_{ud} \quad \forall u \in C, d \in N$$

$$x(P) \geq 0 \quad \forall P$$

$$0 \leq h_e(\theta) \leq 1$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $\lambda$ indicates a maximum network throughput proportion, $$\sum_{P\in P_{ud}} x(P)$$

indicates total traffic of all feasible paths from u to d, $\theta$ indicates a parameter related to link balance, $h_e(\theta)$ indicates a relation function of weight parameters and $\theta$, the weight parameters include $\gamma_e$ and $\gamma_P$, $\gamma_e$ indicates a weight parameter of the link e, $\gamma_P$ indicates a weight parameter of the path P, c(e) indicates total bandwidth of the link e, g(e) indicates uncontrollable traffic of the link e, and $$\sum_{P:e\in P} x(P)$$

indicates total controllable traffic of all feasible paths on the link e; and $h_e(\theta)$ may be any one of the following according to different weight values of the weight parameters $\gamma_e$ and $\gamma_P$:

$$h_e(\theta) = \frac{\gamma_e \max_{P:e\in P}\gamma_P}{\theta}; \quad h_e(\theta) = \exp\left(-\frac{1}{\gamma_e}\frac{\log\theta}{\max_{P:e\in P}\gamma_P}\right) \text{ or}$$

$$\theta^{-\frac{1}{\gamma_e}\frac{1}{\max_{P:e\in P}\gamma_P}}; \quad h_e(\theta) = \exp\left(-\frac{1}{\gamma_e}\log\left(\frac{\theta}{\max_{P:e\in P}\gamma_P}\right)\right) \text{ or}$$

$$\left(\frac{\theta}{\max_{P:e\in P}\gamma_P}\right)^{-\frac{1}{\gamma_e}}; \text{ or } h_e(\theta) = \gamma_e\exp\left(-\frac{\log\theta}{\max_{P:e\in P}\gamma_P}\right) \text{ or } \gamma_e\theta^{-\frac{1}{\max_{P:e\in P}\gamma_P}}.$$

That is, when $U(\{\rho(e)\}$ indicating the network cost is being constructed, different weight values need to be set by considering the weight parameters, and corresponding $h_e(\theta)$ has different forms. If a monotonically increasing subfunction in $U_c(\{\rho(e)\}_{\forall e})$ is the same for $\rho(e)$ of all links, the subfunction can be replaced with another monotonically increasing subfunction. The weight parameter $\gamma_P > 0$ of the path P may be weighted to $U_c^P(\{\rho(e)\}_{\forall e})$ by using a product method or an exponential method. The weight parameter $\gamma_e > 0$ of the link e may also be weighted to $U_c^e(\{\rho(e)\}_{\forall e})$ by using the product method or the exponential method. Therefore, there are four methods for setting the two weight parameters ($\gamma_P$ and $\gamma_e$): When the product method is used for both parameters, $$h_e(\theta) = \frac{\gamma_e \max_{P:e\in P}\gamma_P}{\theta};$$

when the exponential method is used for both parameters, $$h_e(\theta) = \exp\left(-\frac{1}{\gamma_e}\frac{\log\theta}{\max_{P:e\in P}\gamma_P}\right) \text{ or } \theta^{-\frac{1}{\gamma_e}\frac{1}{\max_{P:e\in P}\gamma_P}};$$

when the product method is used for $\gamma_P$ and the exponential method is used for $\gamma_e$, $$h_e(\theta) = \exp\left(-\frac{1}{\gamma_e}\log\left(\frac{\theta}{\max_{P:e\in P}\gamma_P}\right)\right) \text{ or } \left(\frac{\theta}{\max_{P:e\in P}\gamma_P}\right)^{-\frac{1}{\gamma_e}};$$

when the exponential method is used for $\gamma_P$ and the product method is used for $\gamma_e$, $$h_e(\theta) = \gamma_e\exp\left(-\frac{\log\theta}{\max_{P:e\in P}\gamma_P}\right) \text{ or } \gamma_e\theta^{-\frac{1}{\max_{P:e\in P}\gamma_P}}.$$

For example, $$U_c(\{\rho(e)\}_{\forall e\in P}) \approx \sum_{P\in P_{ud}} \gamma_P U_c^P(\{\rho(e)\}_{\forall e\in P}),$$

-continued $$U_c^P(\{\rho(e)\}_{\forall e \in P}) \approx \sum_{e \in P} \gamma_e U_c^e(\{\rho(e)\}_{\forall e}),$$

and in this embodiment of the present application, $$h_e(\theta) = \frac{\gamma_e \max_{P:e \in P} \gamma_P}{\theta};$$

for example, $$U_c(\{\rho(e)\}_{\forall e \in P}) \approx \sum_{P \in P_{ud}} (U_c^P(\{\rho(e)\}_{\forall e \in P}))^{\gamma_P},$$

$$U_c^P(\{\rho(e)\}_{\forall e}) \approx \sum_{e \in P} \gamma_e U_c^e(\{\rho(e)\}_{\forall e}),$$

and in this embodiment of the present application, $$h_e(\theta) = \gamma_e \theta^{-\frac{1}{\max_{P:e \in P} \gamma_P}};$$

for example, $$U_c(\{\rho(e)\}_{\forall e}) \approx \sum_{P \in P_{ud}} \gamma_P U_c^P(\{\rho(e)\}_{\forall e \in P}),$$

$$U_c^P(\{\rho(e)\}_{\forall e \in P}) \approx \sum_{P \in P_{ud}} (U_c^e(\{\rho(e)\}_{\forall e \in P}))^{\gamma_e},$$

and in this embodiment of the present application, $$h_e(\theta) = \left(\frac{\theta}{\max_{P:e \in P} \gamma_P}\right)^{-\frac{1}{\gamma_e}};$$

for example, $$U_c(\{\rho(e)\}_{\forall e \in P}) \approx \sum_{P \in P_{ud}} (U_c^P(\{\rho(e)\}_{\forall e}))^{\gamma_P},$$

$$U_c^P(\{\rho(e)\}_{\forall e \in P}) \approx \sum_{P \in P_{ud}} (U_c^e(\{\rho(e)\}_{\forall e}))^{\gamma_e},$$

and in this embodiment of the present application, $$h_e(\theta) = \theta^{-\frac{1}{\gamma_e} \frac{1}{\max_{P:e \in P} \gamma_P}}.$$

Without loss of generality, $U_c^e(\{\rho(e)\}_{\forall e})$ may be $U_c^e(\{\rho(e)\}_{\forall e}) = 1/\rho(e)$, and can be replaced with another monotonically increasing subfunction, for example, $U_c^e(\{\rho(e)\}_{\forall e}) = \exp(1/\rho(e))$.

For the foregoing four cases, the formula (5-21) may be transformed into the formulas (5-22), (5-23), (5-24), and (5-25).

$$\min_{x(P),\theta} \theta \quad (5\text{-}22)$$

where constraint conditions are:

$$\sum_{P:e \in P} x(P) \leq (c(e) - g(e)) \quad \forall e \in E \quad (5\text{-}23)$$

$$\sum_{P:e \in P} x(P) \geq \frac{\gamma_e \max_{P:e \in P} \gamma_P}{\theta}(c(e) - g(e)) \quad \forall e \in E$$

$$\sum_{P \in P_{ud}} x(P) = I_{ud} \quad \forall u \in C, d \in N$$

$$x(P) \geq 0 \quad \forall P$$

$$\gamma_e \max_{P:e \in P} \gamma_P \leq \theta$$

$$\min_{x(P),\theta} \theta$$

where constraint conditions are:

$$\sum_{P:e \in P} x(P) \leq (c(e) - g(e)) \quad \forall e \in E \quad (5\text{-}24)$$

$$\sum_{P:e \in P} x(P) \geq \left(\frac{\theta}{\max_{P:e \in P} \gamma_P}\right)^{-\frac{1}{\gamma_e}} (c(e) - g(e)) \quad \forall e \in E$$

$$\sum_{P \in P_{ud}} x(P) = I_{ud} \quad \forall u \in C, d \in N$$

$$x(P) \geq 0 \quad \forall P$$

$$\max_{P:e \in P} \gamma_P \leq \theta$$

$$\min_{x(P),\theta} \theta$$

where constraint conditions are:

$$\sum_{P:e \in P} x(P) \leq (c(e) - g(e)) \quad \forall e \in E \quad (5\text{-}25)$$

$$\sum_{P:e \in P} x(P) \geq \gamma_e \theta^{-\frac{1}{\max_{P:e \in P} \gamma_P}} (c(e) - g(e)) \quad \forall e \in E$$

$$\sum_{P \in P_{ud}} x(P) = I_{ud} \quad \forall u \in C, d \in N$$

$$x(P) \geq 0 \quad \forall P$$

$$\gamma_e^{\max_{P:e \in P} \gamma_P} \leq \theta$$

$$\min_{x(P),\theta} \theta$$

where constraint conditions are:

$$\sum_{P:e \in P} x(P) \leq (c(e) - g(e)) \quad \forall e \in E$$

$$\sum_{P:e \in P} x(P) \geq \theta^{-\frac{1}{\gamma_e} \frac{1}{\max_{P:e \in P} \gamma_P}} (c(e) - g(e)) \quad \forall e \in E$$

$$\sum_{P \in P_{ud}} x(P) = I_{ud} \quad \forall\, u \in C,\, d \in N$$

$$x(P) \geq 0 \quad \forall\, P$$

$$1 \leq \theta$$

Alternatively, the controller minimizes a cost of all paths in the communications network according to any one of the following formulas: formula (6-11) or formula (6-12).

Specifically, that the controller minimizes a cost of all paths in the communications network according to the parameter information includes that the controller minimizes a network cost of the communications network according to the formula (6-11):

$$\max_{x(P),\lambda} \lambda \qquad (6\text{-}11)$$

where constraint conditions are:

$$\sum_{P:e \in P} x(P) \leq k_e(\lambda)(c(e) - g(e)) \quad \forall\, e \in E$$

$$\sum_{P \in P_{ud}} x(P) \geq \lambda I_{ud} \quad \forall\, u \in C,\, d \in N$$

$$x(P) \geq 0 \quad \forall\, P$$

$$0 \leq k_e(\lambda) \leq \lambda$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P \in P_{ud}} x(P)$$

indicates total traffic of all feasible paths from u to d, λ indicates a parameter related to a maximum network throughput, $k_e(\lambda)$ indicates a correspondence between a weight parameter of the link e and λ, $$k_e(\lambda) = \lambda h_e\left(\frac{1}{\lambda}\right),$$

ρ(e) indicates controllable bandwidth utilization of the link e, c(e) indicates total bandwidth of the link e, g(e) indicates uncontrollable traffic of the link e, and $$\sum_{P:e \in P} x(P)$$

indicates total controllable traffic of all feasible paths on the link e.

Further, in another embodiment, that the controller minimizes a network cost of the communications network according to the formula (6-11) includes:

using, by the controller, $k_e(\lambda)$ as a constant, and using a fractional maximum concurrent flow algorithm that has low complexity to solve the formula (6-11), so as to minimize the network cost of the communications network.

That is, the controller may consider $k_e(\lambda)$ in the formula (6-11) as a constant (that is, a current iterative parameter), and use the fractional maximum concurrent flow algorithm that has low complexity to minimize the network cost of the communications network. A short-term link cost in the fractional maximum concurrent flow algorithm is related to the current iterative parameter, for example, a short-term link cost is proportional to or positively correlated with link utilization.

Alternatively, that the controller minimizes a cost of all paths in the communications network according to the parameter information includes that the controller minimizes a maximum cost of all paths in the communications network according to the formula (6-12):

$$\max_{x(P),\lambda} \lambda \qquad (6\text{-}12)$$

where constraint conditions are:

$$\sum_{P:e \in P} x(P) \leq k_e(\lambda)(c(e) - g(e)) \quad \forall\, e \in E$$

$$\sum_{P \in P_{ud}} x(P) \geq \lambda I_{ud} \quad \forall\, u \in C,\, d \in N$$

$$x(P) \geq 0 \quad \forall\, P$$

$$0 \leq k_e(\lambda) \leq \lambda$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P \in P_{ud}} x(P)$$

indicates total traffic of all feasible paths from u to d, λ indicates a parameter related to a maximum network throughput, $k_e(A)$ indicates a correspondence between a weight parameter of the link e and λ, $\gamma_e$ indicates the weight parameter of the link, ρ(e) indicates controllable bandwidth utilization of the link e, c(e) indicates total bandwidth of the link e, g(e) indicates uncontrollable traffic of the link e, $$\sum_{P:e \in P} x(P)$$

indicates total controllable traffic of all feasible paths on the link e, and $k_e(\lambda)$ may be any one of the following according to different weight values of the weight parameter $\gamma_e$:

$$k_e(\lambda) = \frac{1}{\gamma_e} \text{ or } k_e(\lambda) = \lambda^{1-\frac{1}{\gamma_e}}.$$

Further, in another embodiment, that the controller minimizes a network cost of the communications network according to the formula (6-12) includes:

using, by the controller, $k_e(\lambda)$ as a constant, and using a fractional maximum concurrent flow algorithm that has low complexity to solve the formula (6-12), so as to minimize the maximum cost of all paths in the communications network.

That is, the controller may consider $k_e(\lambda)$ in the formula (6-12) as a constant (that is, a current iterative parameter), and use the fractional maximum concurrent flow algorithm that has low complexity to minimize the network cost of the communications network. A short-term link cost in the fractional maximum concurrent flow algorithm is related to the current iterative parameter, for example, a short-term link cost is proportional to or positively correlated with link utilization.

Alternatively, the controller minimizes a maximum cost of all paths in the communications network according to any one of the following formulas: formula (6-21) or formula (6-22).

Specifically, that the controller minimizes a cost of all paths in the communications network according to the parameter information includes that the controller minimizes a network cost of the communications network according to the formula (6-21):

$$\max_{x(P),\lambda} \lambda \qquad (6\text{-}21)$$

where constraint conditions are:

$$\sum_{P:e\in P} x(P) \leq (c(e) - g(e)) \quad \forall e \in E$$

$$\sum_{P:e\in P} x(P) \geq k_e(\lambda)(c(e) - g(e)) \quad \forall e \in E$$

$$\sum_{P\in P_{ud}} x(P) = I_{ud} \quad \forall u \in C, d \in N$$

$$x(P) \geq 0 \quad \forall P$$

$$0 \leq k_e(\lambda) \leq \lambda$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, X(P) indicates traffic of the path P, $\lambda$ indicates a parameter related to a network throughput in a balanced network, $$\sum_{P\in P_{ud}} x(P)$$

indicates total traffic of all feasible paths from u to d, $k_e(\lambda)$ indicates a correspondence between a weight parameter of the link e and $\lambda$, $$k_e(\lambda) = h_e\left(\frac{1}{\lambda}\right),$$

weight parameters include $\gamma_e$ and $\gamma_P$, $\gamma_e$ indicates the weight parameter of the link, $\gamma_P$ indicates a weight parameter of the path, $\rho(e)$ indicates controllable bandwidth utilization of the link e, c(e) indicates total bandwidth of the link e, g(e) indicates uncontrollable traffic of the link e, and $$\sum_{P:e\in P} x(P)$$

indicates total controllable traffic of all feasible paths on the link e.

Further, in another embodiment, that the controller minimizes a network cost of the communications network according to the formula (6-21) includes:

using, by the controller, $k_e(\lambda)$ as a constant, and using an improved fractional maximum concurrent flow algorithm to solve the formula (6-21), so as to minimize the network cost of the communications network.

That is, the controller may consider $k_e(\lambda)$ in the formula (6-21) as a constant (that is, a current iterative parameter), and use a fractional maximum concurrent flow algorithm that has low complexity to minimize the network cost of the communications network. A short-term link cost in the fractional maximum concurrent flow algorithm is related to the current iterative parameter, for example, a short-term link cost is proportional to or positively correlated with link utilization.

Alternatively, that the controller minimizes a cost of all paths in the communications network according to the parameter information includes that the controller minimizes a maximum cost of all paths in the communications network according to the formula (6-22).

$$\max_{x(P),\lambda} \lambda \qquad (6\text{-}22)$$

where constraint conditions are:

$$\sum_{P:e\in P} x(P) \leq (c(e) - g(e)) \quad \forall e \in E$$

$$\sum_{P:e\in P} x(P) \geq k_e(\lambda)(c(e) - g(e)) \quad \forall e \in E$$

$$\sum_{P\in P_{ud}} x(P) = I_{ud} \quad \forall u \in C, d \in N$$

$$x(P) \geq 0 \quad \forall P$$

$$0 \leq k_e(\lambda) \leq \lambda$$

where e indicates the link, E indicates the set of all links, C indicates the set of flexible nodes, u indicates the flexible node, d indicates the destination node, N indicates the set of all nodes, $I_{ud}$ indicates the injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $\lambda$ indicates a parameter related to a network throughput in a balanced network, $$\sum_{P \in P_{ud}} x(P)$$

indicates total traffic of all feasible paths from u to d, $k_e(\lambda)$ indicates a correspondence between a weight parameter of the link e and $\lambda$, weight parameters include $\gamma_e$ and $\gamma_P$, $\gamma_e$ indicates the weight parameter of the link, $\gamma_p$ indicates a weight parameter of the path, $\rho(e)$ indicates controllable bandwidth utilization of the link e, c(e) indicates total bandwidth of the link e, g(e) indicates uncontrollable traffic of the link e, $$\sum_{P: e \in P} x(P)$$

indicates total controllable traffic of all feasible paths on the link e, and $k_e(\lambda)$ may be any one of the following according to different weight values of the weight parameter $\gamma_e$:

$$k_e(\lambda) = \gamma_e \lambda \text{ or } k_e(\lambda) = \lambda^{\frac{1}{\gamma_e}}.$$

Further, in another embodiment, that the controller minimizes a network cost of the communications network according to the formula (6-22) includes:

using, by the controller, $k_e(\lambda)$ as a constant, and using an improved fractional maximum concurrent flow algorithm to solve the formula (6-22), so as to minimize the maximum cost of all paths in the communications network.

That is, the controller considers $k_e(\lambda)$ in the formula (6-22) as a constant (that is, a current iterative parameter), and uses a revised fractional maximum concurrent flow algorithm (that is, considers a short-term link cost in an original fractional maximum concurrent flow algorithm as a positive value, and based on this, sets a new short-term link cost related to the current iterative parameter, and considers the new short-term link cost as a negative value) to minimize the network cost of the communications network.

Therefore, according to the foregoing solution, in this embodiment of the present application, fast TE control can be implemented, and an algorithm that has low complexity can be used to resolve a problem of existing TE control that is considered to have high complexity in the prior art. That is, in this embodiment of the present application, a more general TE control problem is raised and resolved, so that real-time TE can be implemented.

It should be understood that a person skilled in the art may make various equivalent modifications or changes according to the example given in FIG. 2, and such modifications or changes also fall within the scope of this embodiment of the present application. For example, in actual application, real-time or non-real-time traffic engineering control may be performed according to the method in FIG. 2. This is not limited in this embodiment of the present application. For another example, in FIG. 2, only the SDN network is used as an example to describe the method for traffic engineering in this embodiment of the present application, but this embodiment of the present application is not limited to be in the SDN network. That is, the method for traffic engineering in this embodiment of the present application may also be applied to another network. When being applied to another network, the method is still applicable. For example, when the method is applied to another network, the flexible node and the non-flexible node are collectively referred to as nodes because there is no distinction between them. Therefore, traffic engineering control can be implemented provided that the flexible node in this embodiment of the present application is considered as a node in the network. Such a modification also falls within the protection scope of the present application.

Figure 3:
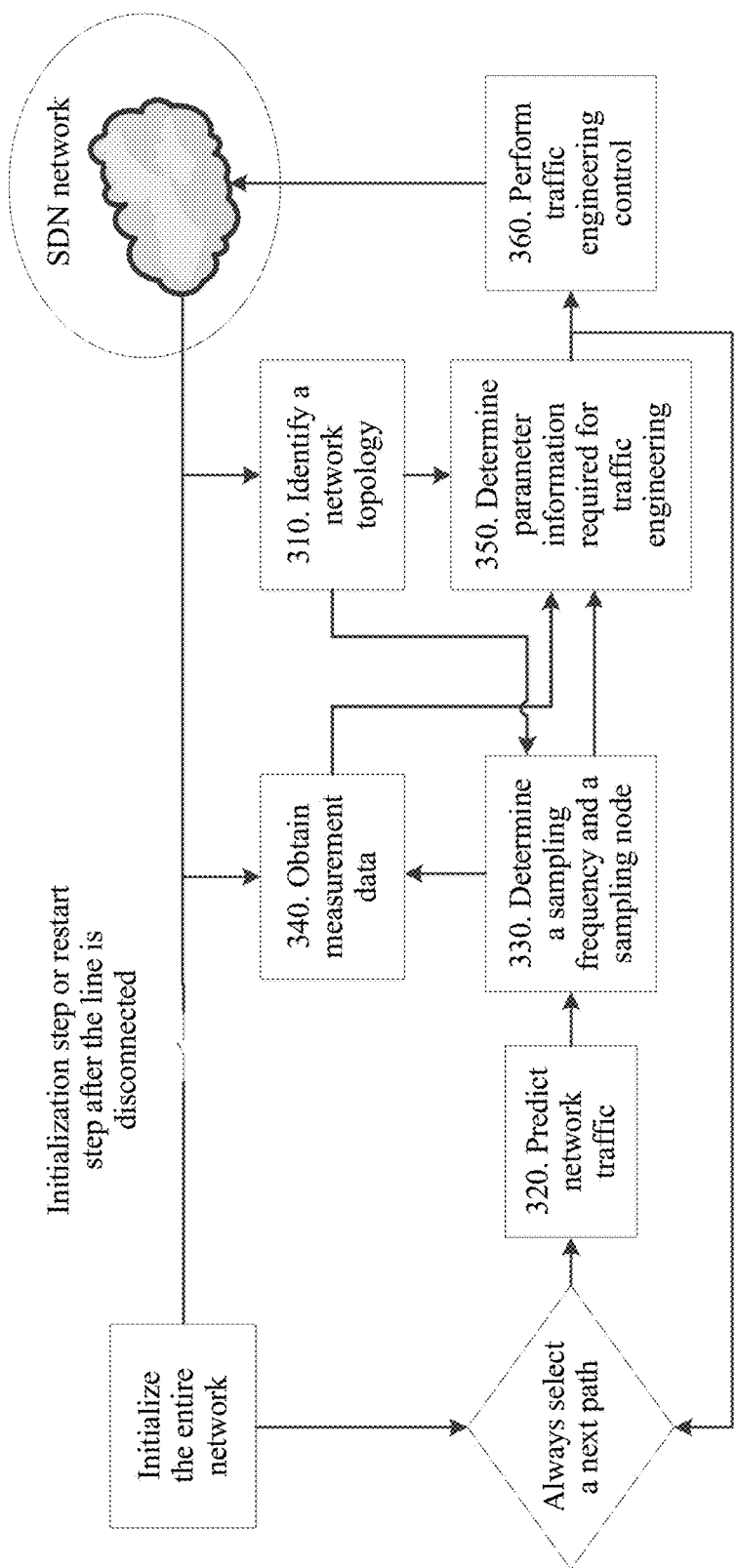
FIG. 3 is a schematic flowchart of a method for traffic engineering in a communications network according to another embodiment of the present application.

The following further describes in detail a method for traffic engineering in an embodiment of the present application with reference to a specific example in FIG. 3. It should be noted that the example in FIG. 3 is merely intended to help a person skilled in the art understand the embodiment of the present application, rather than confining the embodiment of the present application to a specific numerical value or a specific scenario shown in the example. Obviously, a person skilled in the art may make various equivalent modifications or changes according to the example given in FIG. 3, and such modifications or changes also fall within the scope of the embodiment of the present application.

Traffic engineering shown in FIG. 3 is divided into three major processes. A first process is sampling/measurement, and it is partial measurement herein.

A second process is a network traffic model (for TE input recovery). A main function of the network traffic model is to recover an input parameter, that is, use a result of the first process to recover an input parameter required in a third step, that is, a control process, because the result of the first process is usually not the input parameter required in the control process.

The third process is the control process. A main function of the control process is to perform traffic engineering by using the input parameter that is related to network traffic and that is recovered in the second process, that is, achieve a TE objective by means of entire-network routing optimization.

In FIG. 3, steps 310 to 340 are corresponding to the first process, step 350 is corresponding to the second process, and step 360 is corresponding to the third process.

The following separately describes each process in detail. Specifically, the method shown in FIG. 3 may be performed by each function module in a controller. It should be noted that, for ease of description, in this embodiment of the present application, each step may be performed by a corresponding function module. Herein division of the function modules is intended for ease of description. In actual application, a corresponding entity unit implements a function of a corresponding function module. For example, each function module may be a processor, and the processor generates an instruction to implement a function of the function module. This is not limited in this embodiment of the present application. The following separately describes each step in detail. Specifically, the method 300 includes the following steps.

310. Identify a network topology.

This process may be performed by a topology identification module. All descriptions in the present application are based on an assumption that the topology is known. A method for obtaining the topology is using the Link Layer Discovery Protocol (LLDP). This is not limited in this embodiment of the present application.

320. Predict network traffic.

This process may be performed by a sampling frequency and location module. In this embodiment of the present application, optionally, traffic measurement may be performed first to obtain total traffic in a time unit (a network node location and a link are obtained from the topology identification module), or preliminary estimation is performed, for example, preliminary estimation is performed according to historical data. This is described in detail below.

330. Determine a sampling frequency and a sampling node.

This process may be performed by the sampling frequency and location module. The sampling frequency and location module may obtain the network node location and the link according to step 310, and then determine the sampling frequency (that is, determine a quantity of time units in a sampling time interval) and a sampling location (in one sampling time interval) according to traffic predicted by a network traffic prediction module.

At a specified time point, an SDN controller sends the traffic sampling requirement (a sampling frequency determined by the SDN controller) to a relevant sampling apparatus of an SDN forwarding device (SDN-FE).

Specifically, the controller (which may be, for example, the sampling frequency and location module) determines a quantity of the at least one sampling node and the temporal frequency according to the following formulas:

$$|C_s|=\gamma_{11}|C|$$

$$V*T_s=\gamma_{12}\log(|C_s|)$$

or $$|C_s|=\log(\gamma_{21}|C|)$$

$$V*T_s=\gamma_{22}|C_s|,$$

where $|C_s|$ indicates the quantity of sampling nodes, $T_s$ indicates the sampling frequency, V indicates the estimated total traffic, C indicates a set of flexible nodes in the communications network, $|C|$ indicates a quantity of flexible nodes in the communications network, $\gamma_{11}$, $\gamma_{12}$, $\gamma_{21}$, and $\gamma_{22}$ are preset constant parameters, $0<\gamma_{11}<1$, and $0<\log(\gamma_{21}|C|)<|C|$.

After determining the quantity of sampling nodes, the controller randomly selects $|C_s|$ nodes from the set of flexible nodes, and uses the $|C_s|$ nodes as a set of the sampling nodes.

It should be understood that, in this embodiment of the present application, a random probability is not limited, for example, an equal probability may be available, the probability may be determined according to a quantity of historical node access times, or the probability may be determined according to a node degree. This is not limited in this embodiment of the present application.

Alternatively, the controller determines a quantity of the at least one sampling node and the temporal frequency for each destination node d according to the following formulas:

$$|C_s^d|=\gamma_{11}^d|C|$$

$$V^d*T_s^d=\gamma_{12}\log(|C_s^d|)$$

or $$|C_s^d|=\log(\gamma_{21}^d|C|)$$

$$V^d*T_s^d=\gamma_{22}|C_s^d|,$$

where $|C_s^d|$ indicates a quantity of sampling nodes corresponding to the destination node d, $T_s^d$ indicates a sampling frequency corresponding to the destination node d, $V^d$ indicates estimated total traffic to the destination node d, C indicates a set of flexible nodes in the communications network, $|C|$ indicates a quantity of flexible nodes in the communications network, $\gamma_{11}^d$, $\gamma_{12}^d$, $\gamma_{21}^d$, and $\gamma_{22}^d$ are preset constant parameters, $0<\gamma_{11}^d<1$, and $0<\log(\gamma_{21}^d|C|)<|C|$.

The controller selects, for each destination node d, $|C_s^d|$ nodes in a path in a directed acyclic graph (DAG) that is pre-generated based on a topology of flexible nodes and uses the $|C_s^d|$ nodes as a set of the sampling nodes, or randomly selects $|C_s^d|$ nodes from the set of flexible nodes and uses the $|C_s^d|$ nodes as a set of the sampling nodes.

For example, each selected sampling node is selected from an independent path in the DAG For example, $|C_s^d|$ common nodes are selected from a common DAG portion of all destination nodes d. That is, the destination nodes d may have a same DAG graph, or may have different DAG graphs. This embodiment of the present application is not limited thereto.

340. Obtain measurement data.

This process may be performed by a sampling (measurement) module (Sampling Module). Some TE-related data is sampled for a traffic engineering (TE) purpose. For an SDN TE problem, in the present application, a flow W passing through the sampling node needs to be sampled in each sampling time interval according to a time and a sampling node location that are specified by the sampling frequency and location module. A specific sampling process may be performed according to an existing method. A specific sampling method is not limited in the present application.

The sampling node may perform sampling according to the sampling frequency and the sampling location. A specific sampling method and procedure at a specified time point and a specified sampling node may be performed by using the prior art, for example, may be performed according to the following method, but this embodiment of the present application is not limited thereto.

The controller matches flow table entry information with sampling node information to generate a group table entry (which includes a sampling frequency for performing a sampling action) and a guide flow table entry (including flow information), and sends the group table entry and the guide flow table entry to the sampling node, so that the sampling node performs sampling at the sampling frequency.

Finally, the sampling node sends sampled measurement data to the controller, that is, the controller obtains the measurement data.

350. Determine parameter information required for traffic engineering.

This process may be performed by an input recovery module. The input recovery module estimates a value of a factor that needs to be used or may be used for traffic engineering (TE). (An operation time of the input recovery module uses a sampling time interval as a unit.)

Input to the input recovery module is an available network measurement result (that is, an output result of the sampling module). In this embodiment, in a time unit, the input to the input recovery module is a flow W(u, d) that passes through each SDN-FE, that is, node u, and goes to each destination d and total traffic total traffic f(e) of each link e. That is, in a sampling time interval, W and f(e) are the input to the input recovery module for each d.

Output of the input recovery module is a network status in which TE can be performed. In this embodiment, in a time unit, the output of the input recovery module is a flow I(u, d) injected from each SDN-FE, that is, node u, to each destination d and uncontrollable traffic g(e) of each link e. That is, in a sampling time interval, I and g are the output of the input recovery module for each d.

Specifically, the controller may determine, according to a formula (1), the parameter information required for traffic engineering.

The foregoing has described solving $l_0$ norm minimization to determine the parameter information required for traffic engineering. In this embodiment of the present application, the parameter information required for traffic engineering may be determined in another alternative manner. For example, the parameter information required for traffic engineering may be determined by solving $l_1$ norm minimization, weighted $l_1$ norm minimization, or $l_p$ norm minimization, where $0 < p \leq 1$. Details are separately described below.

That is, the controller may determine, according to any one of a formula (2), a formula (3), or a formula (4), the parameter information required for traffic engineering.

360. Perform traffic engineering control.

This process may be performed by a network traffic engineering control module (TE Control Module). An objective of this module is to achieve some TE objectives, for example, reducing network congestion, optimizing network utilization, and balancing network load. The controller may reduce maximum link utilization in the communications network to achieve some TE objectives.

It should be understood that each operation in traffic engineering may be based on a time unit or a sampling time interval. Input to the network TE control module may be an available network status (that is, an output result of the input recovery module). The network TE control module provides each path from each flexible node u to each destination node d and traffic of the path.

Specifically, the controller minimizes a cost of all paths in the communications network according to the parameter information.

Further, the controller minimizes the cost of all the paths in the communications network according to a formula (5) or (6).

Alternatively, in another embodiment, the controller may minimize a path cost according to any one of a special example of the formula (5), such as a formula (5-11), a formula (5-12), a formula (5-13), a formula (5-14), a formula (5-15), a formula (5-21), a formula (5-22), a formula (5-23), a formula (5-24), or a formula (5-25), or a special example of the formula (6), such as a formula (6-11), a formula (6-12), a formula (6-21), or a formula (6-22). For details, refer to each process in the corresponding method embodiments. To avoid repetition, details are not described herein again.

It should be noted that the controller in this embodiment of the present application may further include another module, for example, a communication module, which is mainly responsible for communication between modules. Because a function of the communication module may be implemented by using another module, the communication module is optional.

At a specified time point, the module may instruct the SDN controller to send the traffic sampling requirement (including the sampling frequency) specified by the sampling frequency and location module and the flow table information (including the guide flow table entry) generated by the network traffic engineering control module to a specified SDN forwarding device, so that a sampling device (for example, Huawei's UTraffic or Netflow device) attached to the SDN forwarding device performs sampling, and the SDN forwarding device constructs a guide flow table entry (which needs to be constructed according to the result of the network traffic engineering control module) of a controllable flow and an original guide flow table entry of an uncontrollable flow.

It should be understood that sequence numbers of the foregoing processes do not mean execution sequences. The execution sequences of the processes should be determined according to functions and internal logic of the processes, and should not be construed as any limitation on the implementation processes of the embodiments of the present application.

Figure 4:
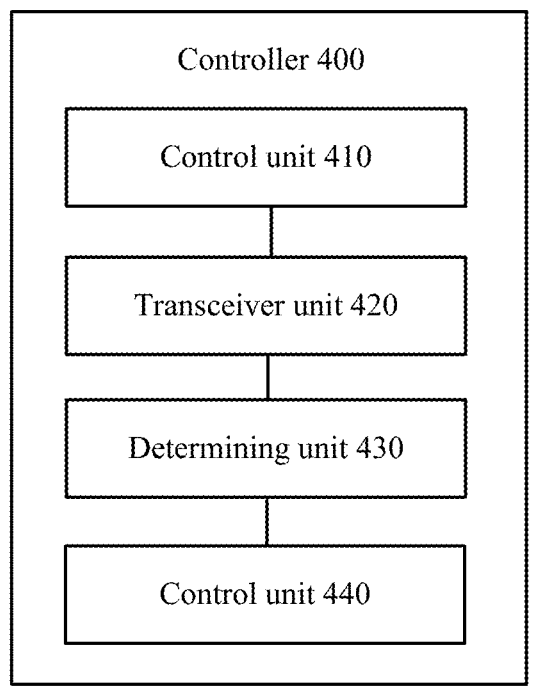
FIG. 4 is a schematic block diagram of a controller device in a communications network according to an embodiment of the present application.

FIG. 4 is a schematic block diagram of a controller device in a communications network according to an embodiment of the present application. It should be understood that a controller 400 shown in FIG. 4 can implement each process in the method for traffic engineering in a communications network in the embodiments shown in FIG. 2 and FIG. 3. An operation and/or a function of each module in the controller 400 are/is used to implement a corresponding procedure in the method embodiments shown in FIG. 2 and FIG. 3. For details, refer to the descriptions in the foregoing method embodiments. To avoid repetition, details are appropriately omitted herein.

Specifically, the communications network includes the controller and multiple nodes. The multiple nodes include a flexible node and a non-flexible node. The flexible node is directly connected to the controller, and the non-flexible node is indirectly connected to the controller. The controller 400 shown in FIG. 4 includes a control unit 410, a transceiver unit 420, a determining unit 430, and a control unit 440.

The control unit 410 is configured to determine at least one sampling node in the flexible node and a temporal frequency for traffic sampling. The transceiver unit 420 is configured to instruct the at least one sampling node to perform traffic sampling at the temporal frequency, and receive sampled traffic data that is of all sampling nodes and that is obtained during each sampling. The determining unit 430 is configured to determine, according to the sampled traffic data obtained during each sampling and information about total traffic of a link whose link utilization is greater than a first preset value or less than a second preset value in the communications network, parameter information required for traffic engineering. The control unit 440 is configured to perform traffic engineering control according to the parameter information.

Therefore, in this embodiment of the present application, traffic sampling is performed at the temporal frequency by the determined at least one sampling node. The controller instructs the at least one sampling node to sample data at the temporal frequency, and receives the sampled traffic data that is of all sampling nodes and that is obtained during each sampling; determines, according to the sampled traffic data, the parameter information required for traffic engineering; and finally performs traffic engineering control according to the parameter information. TE control based on partial measurement is implemented.

Optionally, in another embodiment, the sampled traffic data includes service traffic that passes through or starts from each sampling node in the communications network and goes to each destination node in the communications network.

Optionally, in another embodiment, the control unit 410 is specifically configured to determine, according to estimated total traffic of a service in the communications network, the at least one sampling node and the temporal frequency for traffic sampling.

Further, in another embodiment, the control unit 410 is specifically configured to determine a quantity of the at least one sampling node and the temporal frequency according to the following formulas:

$$|C_s| = \gamma_{11}|C|$$

$$V*T_s = \gamma_{12} \log(|C_s|)$$

or $$|C_s| = \log(\gamma_{21}|C|)$$

$$V*T_s = \gamma_{22}|C_s|,$$

where $|C_s|$ indicates the quantity of sampling nodes, $T_s$ indicates the sampling frequency, V indicates the estimated total traffic, C indicates a set of flexible nodes in the communications network, $|C|$ indicates a quantity of flexible nodes in the communications network, $\gamma_{11}$, $\gamma_{12}$, $\gamma_{21}$, and $\gamma_{22}$ are preset constant parameters, $0<\gamma_{11}<1$, and $0<\log(\gamma_{21}|C|)<|C|$.

After determining the quantity of sampling nodes, the control unit 410 randomly selects $|C_s|$ nodes from the set of flexible nodes, and uses the $|C_s|$ nodes as a set of the sampling nodes.

Alternatively, the control unit 410 is specifically configured to determine a quantity of the at least one sampling node and the temporal frequency for each destination node d according to the following formulas:

$$|C_s^d| = \gamma_{11}^d|C|$$

$$V^d*T_s^d = \gamma_{12}^d \log(|C_s^d|)$$

or $$|C_s^d| = \log(\gamma_{21}^d|C|)$$

$$V^d*T_s^d = \gamma_{22}^d|C_s^d|,$$

where $|C_s^d|$ indicates a quantity of sampling nodes corresponding to the destination node d, $T_s^d$ indicates a sampling frequency corresponding to the destination node d, $V^d$ indicates estimated total traffic to the destination node d, C indicates a set of flexible nodes in the communications network, $|C|$ indicates a quantity of flexible nodes in the communications network, $\gamma_{11}^d$, $\gamma_{12}^d$, $\gamma_{21}^d$, and $\gamma_{22}^d$ are preset constant parameters, $0<\gamma_{11}^d<1$, and $0<\log(\gamma_{21}^d|C|)<|C|$.

After determining the quantity of sampling nodes, the control unit 410 selects, for each destination node d, $|C_s^d|$ nodes in a path in a directed acyclic graph DAG that is pre-generated based on a topology of flexible nodes and uses the $|C_s^d|$ nodes as a set of the sampling nodes, or randomly selects $C_s^d$ nodes from the set of flexible nodes and uses the $|C_s^d|$ nodes as a set of the sampling nodes.

Optionally, in another embodiment, the parameter information required for traffic engineering includes injected service traffic from each flexible node to each destination node in the communications network and uncontrollable service traffic in a link whose link utilization is greater than a preset value in the communications network.

The determining unit 430 is specifically configured to determine, according to the following formula (1), the parameter information required for traffic engineering:

$$\min_{\Delta I} \|vec(\Delta I)\|_{l_0} \qquad (1)$$

where constraint conditions are:

$$W_{wd} = \sum_{u \leq w} \beta_w(u, d) I_{ud}$$

$$I_{current} = I_{ud} = \Delta I + I_{last\ iteration}$$

$$g(e) = f(e) - \sum_{u \in C} \sum_{d \in N} \alpha_e(u, d) I_{ud}, \forall e \in E$$

where E indicates a set of all links in the communications network, N indicates a set of all nodes in the communications network, and C indicates a set of all flexible nodes in the communications network;

w indicates a sampling node, u indicates a flexible node, d indicates a destination node, $\Delta I$ indicates a difference between injected traffic $I_{last\ iteration}$ of the flexible node u that is obtained during previous sampling and injected traffic $I_{ud}$ of the flexible node u that is obtained during current sampling, and $vec(\Delta I)$ indicates that all elements $\Delta I$ (for all flexible nodes u) are combined as a vector;

$\min_{\Delta I} \|vec(\Delta I)\|^{l_0}$ to indicates a minimum $l_0$ norm of vec $(\Delta I)$;

e indicates a link whose link utilization is greater than the first preset value or a link whose link utilization is less than the second preset value in the communications network, f(e) indicates total traffic of the link e, and g(e) indicates uncontrollable service traffic in the link e;

$W_{wd}$ indicates service traffic that passes through or starts from the sampling node w in the communications network and goes to the node d in the communications network, and $I_{ud}$ indicates injected service traffic from the flexible node u to the destination node d; and $\alpha_e(u,d)$ indicates a total fraction of a packet that is transmitted from the node u to the destination d and passes through the link e, $\beta_w(u,d)$ indicates a total fraction of a packet that is transmitted from the node u to the destination d and passes through the sampling node w, and $u \leq w$ indicates that w is passed through by a packet transmitted from u.

Alternatively, in another embodiment, the parameter information required for traffic engineering includes injected service traffic from each flexible node to each destination node in the communications network and uncontrollable service traffic in a link whose link utilization is greater than a preset value in the communications network.

The determining unit 430 is specifically configured to determine, according to any one of the following formula (2), formula (3), or formula (4), the parameter information required for traffic engineering:

$$W_{current} = \beta I_{current}$$

$$I_{current} = I_{ud} = \Delta I + I_{last\ iteration}$$

$$g(e) = f(e) - \sum_{u \in C} \sum_{d \in N} \alpha_e(u, d) I_{ud}, \forall e \in E$$

where constraint conditions are:

$$\min_{\Delta I} \|vec(\Delta I)\|_{l_1} \qquad (2)$$

where E indicates a set of all links in the communications network, N indicates a set of all nodes in the communications network, and C indicates a set of all flexible nodes in the communications network;

w indicates a sampling node, u indicates a flexible node, d indicates a destination node, ΔI indicates a difference between injected traffic $I_{last\ iteration}$ of the flexible node u that is obtained during previous sampling and injected traffic $I_{ud}$ of the flexible node u that is obtained during current sampling, and vec(ΔI) indicates that all elements ΔI (for all flexible nodes u) are combined as a vector;

$$\min_{\Delta I} \|vec(\Delta I)\|_{l_1}$$

indicates a minimum $l_1$ norm of vec(ΔI);

e indicates a link whose link utilization is greater than the first preset value or a link whose link utilization is less than the second preset value in the communications network, f(e) indicates total traffic of the link e, and g(e) indicates uncontrollable service traffic in the link e;

$W_{wd}$ indicates service traffic that passes through or starts from the sampling node w in the communications network and goes to the node d in the communications network, and $I_{ud}$ indicates injected service traffic from the flexible node u to the destination node d; and $α_e(u,d)$ indicates a total fraction of a packet that is transmitted from the node u to the destination d and passes through the link e, $β_w(u,d)$ indicates a total fraction of a packet that is transmitted from the node u to the destination d and passes through the sampling node w, and u≤w indicates that w is passed through by a packet transmitted from u;

$$\min_{\Delta I} \|diag(m)vec(\Delta I)\|_{l_1} \quad (3)$$

where constraint conditions are:

$$W_{current} = \beta I_{current}$$

$$I_{current} = I_{ud} = \Delta I + I_{last\ iteration}$$

$$g(e) = f(e) - \sum_{u \in C}\sum_{d \in N} \alpha_e(u,d)I_{ud}, \forall e \in E$$

where m indicates a weight, $$m = \frac{1}{\varepsilon + |\Delta I|},$$

an initial value of m is 1, diag(m) indicates a diagonal matrix, and if a $u^{th}$ element of vec(ΔI) is ΔI, a $u^{th}$ diagonal element of the diagonal matrix is $$m = \frac{1}{\varepsilon + |\Delta I|}; \text{ and } \min_{\Delta I}\|diag(m)vec(\Delta I)\|_{l_1}$$

indicates a minimum $l_1$ norm of diag(m)vec(ΔI).

$$\min_{\Delta I}\|vec(\Delta I)\|_{l_p} \quad (4)$$

where constraint conditions are:

$$W_{current} = \beta I_{current}$$

$$I_{current} = I_{ud} = \Delta I + I_{last\ iteration}$$

$$g(e) = f(e) - \sum_{u \in C}\sum_{d \in N} \alpha_e(u,d)I_{ud}, \forall e \in E; \text{ and }$$

$$\min_{\Delta I}\|vec(\Delta I)\|_{l_p}$$

indicates a minimum $l_p$ norm of vec(ΔI), and 0<p≤1.

Optionally, in another embodiment, the control unit 440 is specifically configured to minimize a cost of all paths in the communications network according to the parameter information.

Further, in another embodiment, the control unit 440 minimizes the cost of all the paths in the communications network according to a formula (5) or (6).

Alternatively, in another embodiment, the control unit 440 may minimize a path cost according to any one of a special example of the formula (5), such as a formula (5-11), a formula (5-12), a formula (5-13), a formula (5-14), a formula (5-15), a formula (5-21), a formula (5-22), a formula (5-23), a formula (5-24), or a formula (5-25), or a special example of the formula (6), such as a formula (6-11), a formula (6-12), a formula (6-21), or a formula (6-22). For details, refer to each process in the corresponding method embodiments. To avoid repetition, details are not described herein again.

Therefore, according to the foregoing solution, in this embodiment of the present application, fast TE control can be implemented, and an algorithm that has low complexity can be used to resolve a problem of existing TE control that is considered to have high complexity in the prior art. That is, in this embodiment of the present application, a more general TE control problem is raised and resolved, so that real-time TE can be implemented.

Figure 5:
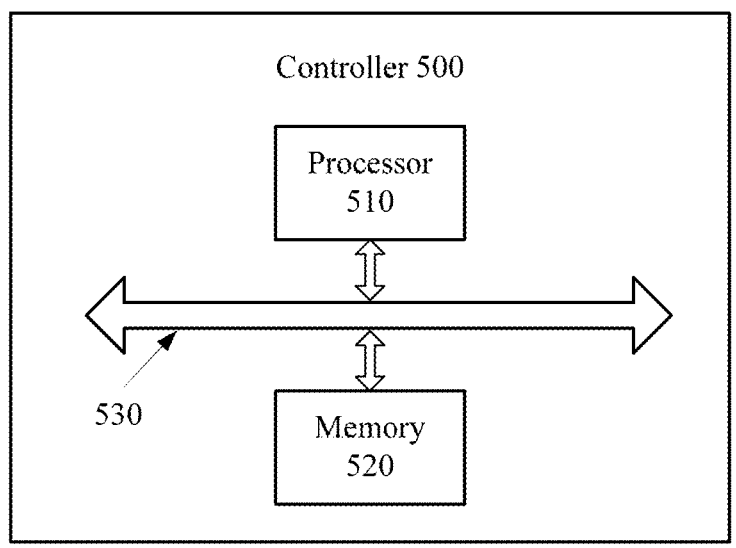
FIG. 5 is a schematic block diagram of a controller device in a communications network according to another embodiment of the present application.

FIG. 5 is a schematic block diagram of a controller device in a communications network according to another embodiment of the present application. It should be understood that a controller 500 shown in FIG. 5 can implement each process in the method for traffic engineering in a communications network in the embodiments shown in FIG. 2 and FIG. 3. An operation and/or a function of each module in the controller 500 are/is used to implement a corresponding procedure in the method embodiments shown in FIG. 2 and FIG. 3. For details, refer to the descriptions in the foregoing method embodiments. To avoid repetition, details are appropriately omitted herein.

Specifically, the communications network includes the controller and multiple nodes. The multiple nodes include a flexible node and a non-flexible node. The flexible node is directly connected to the controller, and the non-flexible node is indirectly connected to the controller. The controller 500 shown in FIG. 5 includes a processor 510 and a memory 520. Optionally, the controller 500 may further include a bus system 530. The processor 510 and the memory 520 are connected by using the bus system 530. The memory 520 is configured to store an instruction. The processor 510 is configured to execute the instruction stored in the memory 520, so as to: determine at least one sampling node in the flexible node and a temporal frequency for traffic sampling; instruct the at least one sampling node to perform traffic sampling at the temporal frequency, and receive sampled traffic data that is of all sampling nodes and that is obtained during each sampling; determine, according to the sampled traffic data obtained during each sampling and information about total traffic of a link whose link utilization is greater than a first preset value or less than a second preset value in the communications network, parameter information required for traffic engineering; and perform traffic engineering control according to the parameter information.

Therefore, in this embodiment of the present application, traffic sampling is performed at the temporal frequency by the determined at least one sampling node. The controller instructs the at least one sampling node to sample data at the temporal frequency, and receives the sampled traffic data that is of all sampling nodes and that is obtained during each sampling; determines, according to the sampled traffic data, the parameter information required for traffic engineering; and finally performs traffic engineering control according to the parameter information. TE control based on partial measurement is implemented.

The methods disclosed in the foregoing embodiments of the present application may be applied to the processor 510 or implemented by the processor 510. The processor 510 may be an integrated circuit chip and has a signal processing capability. In an implementation process, the steps in the foregoing methods may be completed by using an integrated logic circuit of hardware in the processor 510 or an instruction in a form of software. The processor 510 may be a general purpose processor, a digital signal processor (DSP), an application specific integrated circuit (ASIC), a field programmable gate array (FPGA) or another programmable logic device, a discrete gate or transistor logic device, or a discrete hardware component. All methods, steps, and logical block diagrams disclosed in the embodiments of the present application may be implemented or performed. The general purpose processor may be a microprocessor, or the processor may be any normal processor, or the like. The steps of the methods disclosed in the embodiments of the present application may be directly embodied as being executed by a hardware decoding processor, or executed by a combination of hardware of a decoding processor and a software module. The software module may be located in a mature storage medium in the field, such as a random access memory (RAM), a flash memory, a read-only memory ROM), a programmable read-only memory, an electrically-erasable programmable memory, or a register. The storage medium is located in the memory 520. The processor 510 reads information in the memory 520, and completes the steps in the foregoing methods by combining with hardware of the processor 510. In addition to a data bus, the bus system 530 may further include a power bus, a control bus, a status signal bus, and the like. However, for clarity of description, various buses are marked as the bus system 530 in the figure.

Optionally, in another embodiment, the sampled traffic data includes service traffic that passes through or starts from each sampling node in the communications network and goes to each destination node in the communications network.

Optionally, in another embodiment, the processor 510 is specifically configured to determine, according to estimated total traffic of a service in the communications network, the at least one sampling node and the temporal frequency for traffic sampling.

Further, in another embodiment, the processor 510 is specifically configured to determine a quantity of the at least one sampling node and the temporal frequency according to the following formulas:

$|C_s|=\gamma_{11}|C|$ $V*T_s=\gamma_{12}\log(|C_s|)$ or $|C_s|=\log(\gamma_{21}|C|)$ $V*T_s=\gamma_{22}|C_s|$, where $|C_s|$ indicates the quantity of sampling nodes, $T_s$ indicates the sampling frequency, V indicates the estimated total traffic, C indicates a set of flexible nodes in the communications network, $|C|$ indicates a quantity of flexible nodes in the communications network, $\gamma_{11}$, $\gamma_{12}$, $\gamma_{21}$, and $\gamma_{22}$ are preset constant parameters, $0<\gamma_{11}<1$, and $0<\log(\gamma_{21}|C|)<|C|$.

After determining the quantity of sampling nodes, the processor 510 randomly selects $|C_s|$ nodes from the set of flexible nodes, and uses the $|C_s|$ nodes as a set of the sampling nodes.

Alternatively, the processor 510 is specifically configured to determine a quantity of the at least one sampling node and the temporal frequency for each destination node d according to the following formulas:

$|C_s^d|=\gamma_{11}^d|C|$ $V^d*T_s^d=\gamma_{12}^d\log(|C_s^d|)$ or $|C_s^d|=\log(\gamma_{21}^d|C|)$ $V^d*T_s^d=\gamma_{22}^d|C_s^d|$, where $|C_s^d|$ indicates a quantity of sampling nodes corresponding to the destination node d, $T_s^d$ indicates a sampling frequency corresponding to the destination node d, $V^d$ indicates estimated total traffic to the destination node d, C indicates a set of flexible nodes in the communications network, $|C|$ indicates a quantity of flexible nodes in the communications network, $\gamma_{11}^d$, $\gamma_{12}^d$, $\gamma_{21}^d$, and $\gamma_{22}^d$ are preset constant parameters, $0<\gamma_{11}^d<1$, and $0<\log(\gamma_{21}^d|C|)<|C|$.

After determining the quantity of sampling nodes, the processor 510 selects, for each destination node d, $|C_s^d|$ nodes in a path in a directed acyclic graph DAG that is pre-generated based on a topology of flexible nodes and uses the $|C_s^d|$ nodes as a set of the sampling nodes, or randomly selects $|C_s^d|$ nodes from the set of flexible nodes and uses the $|C_s^d|$ nodes as a set of the sampling nodes.

Optionally, in another embodiment, the parameter information required for traffic engineering includes injected service traffic from each flexible node to each destination node in the communications network and uncontrollable service traffic in a link whose link utilization is greater than a preset value in the communications network.

The processor 510 is specifically configured to determine, according to a formula (1), the parameter information required for traffic engineering.

Alternatively, in another embodiment, the parameter information required for traffic engineering includes injected service traffic from each flexible node to each destination node in the communications network and uncontrollable service traffic in a link whose link utilization is greater than a preset value in the communications network.

The processor 510 is specifically configured to determine, according to any one of a formula (2), a formula (3), or a formula (4), the parameter information required for traffic engineering.

Optionally, in another embodiment, the processor 510 is specifically configured to minimize a cost of all paths in the communications network according to the parameter information.

Further, in another embodiment, the processor 510 is specifically configured to minimize the cost of all the paths in the communications network according to a formula (5) or (6).

Alternatively, in another embodiment, the processor 510 may minimize a path cost according to any one of a special example of the formula (5), such as a formula (5-11), a formula (5-12), a formula (5-13), a formula (5-14), a formula (5-15), a formula (5-21), a formula (5-22), a formula (5-23), a formula (5-24), or a formula (5-25), or a special example of the formula (6), such as a formula (6-11), a formula (6-12), a formula (6-21), or a formula (6-22). For details, refer to each process in the corresponding method embodiments. To avoid repetition, details are not described herein again.

Therefore, according to the foregoing solution, in this embodiment of the present application, fast TE control can be implemented, and an algorithm that has low complexity can be used to resolve a problem of existing TE control that is considered to have high complexity in the prior art. That is, in this embodiment of the present application, a more general TE control problem is raised and resolved, so that real-time TE can be implemented.

It should be understood that "an embodiment" or "an embodiment" mentioned in the whole specification does not mean that particular features, structures, or characteristics related to the embodiment are included in at least one embodiment of the present application. Therefore, "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present application, "B corresponding to A" indicates that B is associated with A, and B may be determined according to A. However, it should be further understood that determining B according to A does not mean that B is determined only according to A; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions in the embodiments of the present application.

In addition, function units in the embodiments of the present application may be integrated into one processing unit, or each of the units may exist alone physically, or two or more units are integrated into one unit. The integrated unit may be implemented in a form of hardware, or may be implemented in a form of a software function unit.

With descriptions of the foregoing implementations, a person skilled in the art may clearly understand that the embodiments of the present application may be implemented by hardware, firmware or a combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL) or wireless technologies such as infrared ray, radio, and microwave, the coaxial cable, optical fiber/cable, twisted pair, DSL or wireless technologies such as infrared ray, radio, and microwave are included in fixation of a medium to which they belong. For example, a disk (Disk) and disc (disc) used in the embodiments of the present application includes a compact disc (CD), a laser disc, an optical disc, a digital versatile disc (DVD), a floppy disk, and a Blu-ray disc. The disk generally copies data by a magnetic means, and the disc copies data optically by a laser means. The foregoing combination should also be included in the protection scope of the computer-readable medium.

In summary, what is described above is merely example embodiments of the technical solutions in the embodiments of the present application, but is not intended to limit the protection scope of the embodiments of the present application. Any modification, equivalent replacement, or improvement made without departing from the spirit and principle of the embodiments of the present application shall fall within the protection scope of the embodiments of the present application.

What is claimed is:

1. A method for traffic engineering in a communications network, wherein the communications network comprises a controller and multiple nodes, the multiple nodes comprise at least one flexible node and at least one non-flexible node, the at least one flexible node is directly connected to the controller, the at least one non-flexible node is indirectly connected to the controller, and the method comprises:
   determining, by the controller, at least one sampling node in the at least one flexible node and a temporal frequency for traffic sampling;
   instructing, by the controller, the at least one sampling node to perform traffic sampling at the temporal frequency;
   receiving sampled traffic data of all sampling nodes obtained during each sampling;
   determining, by the controller and according to the sampled traffic data obtained during each sampling and information about total traffic of a link in the communications network whose link utilization is greater than a first preset value or less than a second preset value, parameter information for traffic engineering, wherein the information about total traffic of the link is determined based on the sampled traffic data; and
   performing, by the controller, traffic engineering control according to the parameter information.

2. The method according to claim 1, wherein:
   the sampled traffic data comprises service traffic that passes through or starts from the at least one sampling node in the communications network and goes to each destination node in the communications network.

3. The method according to claim 1, wherein the determining, by the controller, at least one sampling node in the at least one flexible node and a temporal frequency for traffic sampling comprises:
   determining, by the controller and according to estimated total traffic of a service in the communications network, the at least one sampling node and the temporal frequency for traffic sampling.

4. The method according to claim 3, wherein the determining, by the controller and according to estimated total traffic of a service in the communications network, the at least one sampling node and the temporal frequency for traffic sampling comprises:
   determining, by the controller, a quantity of the at least one sampling node and the temporal frequency according to the following formulas:

$|C_s| = \gamma_{11}|C|$ $V*T_s = \gamma_{12} \log(|C_s|)$ or $|C_s| = \log(\gamma_{21}|C|)$ $V*T_s = \gamma_{22}|C_s|$, where $|C_s|$ indicates the quantity of sampling nodes, $T_s$ indicates the sampling frequency, V indicates the estimated total traffic, C indicates a set of flexible nodes in the communications network, $|C|$ indicates a quantity of flexible nodes in the communications network, $\gamma_{11}$, $\gamma_{12}$, $\gamma_{21}$, and $\gamma_{22}$ are preset constant parameters, $0 < \gamma_{11} < 1$, and $0 < \log(\gamma_{21}|C|) < |C|$; and
   after determining the quantity of sampling nodes, randomly selecting, by the controller, $|C_s|$ nodes from the set of flexible nodes, and using the $|C_s|$ nodes as a set of the sampling nodes; or
   determining, by the controller, a quantity of the at least one sampling node and the temporal frequency for each destination node d according to the following formulas:

$|C_s^d| = \gamma_{11}^d|C|$ $V^d*T_s^d = \gamma_{12}^d \log(|C_s^d|)$ or $|C_s^d| = \log(\gamma_{21}^d|C|)$ $V^d*T_s^d = \gamma_{22}^d|C_s^d|$, where $|C_s^d|$ indicates a quantity of sampling nodes corresponding to the destination node d, $T_s^d$ indicates a sampling frequency corresponding to the destination node d, $V^d$ indicates estimated total traffic to the destination node d, C indicates a set of flexible nodes in the communications network, $|C|$ indicates a quantity of flexible nodes in the communications network, $\gamma_{11}^d$, $\gamma_{12}^d$, $\gamma_{21}^d$, and $\gamma_{22}^d$ are preset constant parameters, $0 < \gamma_{11}^d < 1$, and $0 < \log(\gamma_{21}^d|C|) < |C|$; and
   after determining the quantity of sampling nodes, selecting, by the controller and for each destination node d, $|C_s^d|$ nodes in a directed acyclic graph DAG that is pre-generated based on a topology of flexible nodes and using the $|C_s^d|$ nodes as a set of the sampling nodes, or randomly selecting $|C_s^d|$ nodes from the set of flexible nodes and using the $|C_s^d|$ nodes as a set of the sampling nodes.

5. The method according to claim 1, wherein the parameter information for traffic engineering comprises injected service traffic from each flexible node to each destination node in the communications network and uncontrollable service traffic in a link whose link utilization is greater than a preset value in the communications network; and
   the determining, by the controller and according to the sampled traffic data obtained during each sampling and information about total traffic of a link whose link utilization is greater than a first preset value or less than a second preset value in the communications network, parameter information for traffic engineering comprises: determining, according to the following formula (1), the parameter information for traffic engineering:

$\text{Min}_{\Delta I}\|\text{vec}(\Delta I)\|_{l_0}$     (1)

wherein constraint conditions are:

$$W_{wd} = \sum_{u \leq w} \beta_w(u, d) I_{ud} \forall w \in C_s, d \in N$$

$$I_{current} = I_{ud} = \Delta I + I_{last\ iteration}$$

$$g(e) = f(e) - \sum_{u \in C} \sum_{d \in N} \alpha_e(u, d) I_{ud}, \forall e \in E$$

wherein E indicates a set of all links in the communications network, N indicates a set of all nodes in the communications network, C indicates a set of all flexible nodes in the communications network, w indicates a sampling node, u indicates a flexible node, d indicates a destination node, ΔI indicates a difference between injected traffic $I_{ud}$ of the flexible node u that is obtained during current sampling and injected traffic $I_{last\ iteration}$ of the flexible node u that is obtained during previous sampling, vec(ΔI) indicates that all elements ΔI (for all flexible nodes u) are combined as a vector, $\text{Min}_{\Delta I}\|\text{vec}(\Delta I)\|_{l_0}$ indicates a minimum $l_0$ norm of vec(ΔI), e indicates a link whose link utilization is greater than the first preset value or a link whose link utilization is less than the second preset value in the communications network, f(e) indicates total traffic of the link e, g(e) indicates uncontrollable service traffic in the link e, $W_{wd}$ indicates service traffic that passes through or starts from the sampling node w in the communications network and goes to the node d in the communications network, $I_{ud}$ indicates injected service traffic from the flexible node u to the destination node d, $\alpha_e(u,d)$ indicates a total fraction of a packet that is transmitted from the node u to the destination node d and passes through the link e, $\beta_w(u,d)$ indicates a total fraction of a packet that is transmitted from the node u to the destination d and passes through the sampling node w, and u≤w indicates that w is passed through by a packet transmitted from u.

6. The method according claim 1, wherein the parameter information for traffic engineering comprises injected service traffic from each flexible node to each destination node in the communications network and uncontrollable service traffic in a link whose link utilization is greater than a preset value in the communications network; and the determining, by the controller and according to the sampled traffic data obtained during each sampling and information about total traffic of a link whose link utilization is greater than a first preset value or less than a second preset value in the communications network, parameter information for traffic engineering comprises: determining, according to one of the following formula (2), formula (3), or formula (4), the parameter information for traffic engineering:

$$\min_{\Delta I}\|\text{vec}(\Delta I)\|_{l_1} \qquad (2)$$

wherein constraint conditions are:

$$W_{wd} = \sum_{u \leq w} \beta_w(u, d) I_{ud} \forall w \in C_s, d \in N$$

$$I_{current} = I_{ud} = \Delta I + I_{last\ iteration}$$

$$g(e) = f(e) - \sum_{u \in C} \sum_{d \in N} \alpha_e(u, d) I_{ud}, \forall e \in E$$

wherein E indicates a set of all links in the communications network, N indicates a set of all nodes in the communications network, C indicates a set of all flexible nodes in the communications network, w indicates a sampling node, u indicates a flexible node, d indicates a destination node, ΔI indicates a difference between injected traffic $I_{ud}$ of the flexible node u that is obtained during current sampling and injected traffic $I_{last\ iteration}$ of the flexible node u that is obtained during previous sampling, vec(ΔI) indicates that all elements ΔI (for all flexible nodes u) are combined as a vector, $$\min_{\Delta I}\|\text{vec}(\Delta I)\|_{l_1}$$

indicates a minimum $l_1$ norm of vec(ΔI), e indicates a link whose link utilization is greater than the first preset value or a link whose link utilization is less than the second preset value in the communications network, f(e) indicates total traffic of the link e, g(e) indicates uncontrollable service traffic in the link e, $W_{wd}$ indicates service traffic that passes through or starts from the sampling node w in the communications network and goes to the node d in the communications network, $I_{ud}$ indicates injected service traffic from the flexible node u to the destination node d, $\alpha_e(u,d)$ indicates a total fraction of a packet that is transmitted from the node u to the destination d and passes through the link e, $\beta_w(u,d)$ indicates a total fraction of a packet that is transmitted from the node u to the destination d and passes through the sampling node w, and u≤w indicates that w is passed through by a packet transmitted from u;

$$\min_{\Delta I}\|\text{diag}(m)\text{vec}(\Delta I)\|_{l_1} \qquad (3)$$

wherein constraint conditions are:

$$W_{wd} = \sum_{u \leq w} \beta_w(u, d) I_{ud} \forall w \in C_s, d \in N$$

$$I_{current} = I_{ud} = \Delta I + I_{last\ iteration}$$

$$g(e) = f(e) - \sum_{u \in C} \sum_{d \in N} \alpha_e(u, d) I_{ud}, \forall e \in E$$

wherein m indicates a weight, $$m = \frac{1}{\varepsilon + |\Delta I|},$$

initial value of m is 1, diag(m) indicates a diagonal matrix, and if a $u^{th}$ element of vec(ΔI) is ΔI, a $u^{th}$ diagonal element of the diagonal a matrix is $$m = \frac{1}{\varepsilon + |\Delta I|}; \text{ and}$$

$$\min_{\Delta I}\|\text{diag}(m)\text{vec}(\Delta I)\|_{l_1}$$

indicates a minimum $l_1$ norm of $\text{diag}(m)\text{vec}(\Delta I)$;

$$\min_{\Delta I} \|vec(\Delta I)\|_{l_p} \quad (4)$$

wherein constraint conditions are:

$$W_{wd} = \sum_{u \leq w} \beta_w(u,d) I_{ud} \quad \forall w \in C_s, d \in N$$

$$I_{current} = I_{ud} = \Delta I + I_{last\,iteration}$$

$$g(e) = f(e) - \sum_{u \in C}\sum_{d \in N} \alpha_e(u,d) I_{ud}, \quad \forall e \in E; \text{ and}$$

$$\min_{\Delta I} \|vec(\Delta I)\|_{l_p}$$

indicates a minimum $l_p$ norm of $vec(\Delta I)$, and $0 < p \leq 1$.

7. The method according to claim 1, wherein the performing, by the controller, traffic engineering control according to the parameter information comprises: minimizing, by the controller, a cost involving all paths in the communications network according to the parameter information.

8. The method according to claim 7, wherein the minimizing, by the controller, a cost of all paths in the communications network according to the parameter information comprises: minimizing, by the controller, a network cost of the communications network according to the following formula (5):

$$\min_{x(P)} U_c(\{\rho(e)\}_{\forall e}) \quad (5)$$

wherein constraint conditions are:

$$\sum_{P \in P_{ud}} x(P) = I_{ud} \quad \forall u \in C, d \in N$$

$$x(P) \geq 0 \quad \forall P$$

wherein e indicates the link, E indicates a set of all links, C indicates a set of flexible nodes, u indicates the flexible node, d indicates a destination node, N indicates a set of all nodes, $I_{ud}$ indicates injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P \in P_{ud}} x(P)$$

indicates total traffic of all feasible paths from u to d, and $\rho(e)$ indicates controllable bandwidth utilization of the link e, that is, $$\rho(e) \cong \frac{\sum_{P:e \in P} x(P)}{c(e) - g(e)},$$

wherein c(e) indicates total bandwidth of the link e, g(e) indicates uncontrollable traffic of the link e, and $$\sum_{P:e \in P} x(P)$$

indicates total controllable traffic of all feasible paths on the link e; and $U_c(\{\rho(e)\}_{\forall e})$ indicates the network cost.

9. The method according to claim 7, wherein the minimizing, by the controller, a cost of all paths in the communications network according to the parameter information comprises: minimizing, by the controller, a maximum cost of all paths in the communications network according to the following formula (6):

$$\min_{x(P)} \max_{P \in P_{ud}} U_c^P(\{\rho(e)\}_{\forall e \in P}) \quad (6)$$

wherein constraint conditions are:

$$\sum_{P \in P_{ud}} x(P) = I_{ud} \quad \forall u \in C, d \in N$$

$$x(P) \geq 0 \quad \forall P$$

wherein e indicates the link, E indicates a set of all links, C indicates a set of flexible nodes, u indicates the flexible node, d indicates a destination node, N indicates a set of all nodes, $I_{ud}$ indicates injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P \in P_{ud}} x(P)$$

indicates total traffic of all feasible paths from u to d, and $\rho(e)$ indicates controllable bandwidth utilization of the link e, that is, $$\rho(e) \cong \frac{\sum_{P:e \in P} x(P)}{c(e) - g(e)},$$

where c(e) indicates total bandwidth of the link e, g(e) indicates uncontrollable traffic of the link e, and $$\sum_{P:e \in P} x(P)$$

indicates total controllable traffic of all feasible paths on the link e; and $U_c(\{\rho(e)\}_{\forall e})$ indicates a cost of the path P.

10. The method according to claim 7, wherein the minimizing, by the controller, a cost of all paths in the communications network according to the parameter information comprises: minimizing, by the controller, a network cost of the communications network according to a formula (5-11):

$$\min_{x(P),\theta} \theta \quad (5\text{-}11)$$

wherein constraint conditions are:

$$\sum_{P:e\in P} x(P) \le h_e(\theta)(c(e)-g(e)) \quad \forall\, e \in E$$

$$\sum_{P\in P_{ud}} x(P) = I_{ud} \quad \forall\, u \in C, d \in N$$

$$x(P) \ge 0 \quad \forall\, P$$

$$0 \le h_e(\theta) \le 1$$

wherein e indicates the link, E indicates a set of all links, C indicates a set of flexible nodes, u indicates the flexible node, d indicates a destination node, N indicates a set of all nodes, $I_{ud}$ indicates injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P\in P_{ud}} x(P)$$

indicates total traffic of all feasible paths from u to d, λ indicates a maximum network throughput proportion, θ indicates a parameter related to maximum link utilization, $h_e(\theta)$ indicates a relation function of weight parameters and θ, the weight parameters comprise $\gamma_e$ and $\gamma_P$, $\gamma_e$ indicates a weight parameter of the link e, $\gamma_P$ indicates a weight parameter of the path P, c(e) indicates total bandwidth of the link e, g(e) indicates uncontrollable traffic of the link e, and $$\sum_{P:e\in P} x(P)$$

indicates total controllable traffic of all feasible paths on the link e; and $h_e(\theta)$ may be one of the following according to different weight values of the weight parameters $\gamma_e$ and $\gamma_P$:

$$h_e(\theta) = \frac{1}{\gamma_e} \frac{\theta}{\max_{P:e\in P} \gamma_P};\ h_e(\theta) = \exp\!\left(\frac{1}{\gamma}\frac{\log\theta}{\max_{P:e\in P}\gamma_P}\right) \text{ or } \frac{1}{\theta^{\gamma_e}}\frac{1}{\max_{P:e\in P}\gamma_P};$$

$$h_e(\theta) = \exp\!\left(\frac{1}{\gamma_e}\log\!\left(\frac{\theta}{\max_{P:e\in P}\gamma_P}\right)\right) \text{ or } \left(\frac{\theta}{\max_{P:e\in P}\gamma_P}\right)^{\frac{1}{\gamma_e}};\text{ or}$$

$$h_e(\theta) = \frac{1}{\gamma_e}\exp\!\left(\frac{\log\theta}{\max_{P:e\in P}\gamma_P}\right) \text{ or } \frac{1}{\gamma_e}\theta^{\frac{1}{\max_{P:e\in P}\gamma_P}}.$$

11. A controller in a communications network, wherein the communications network comprises the controller and multiple nodes, the multiple nodes comprise at least one flexible node and a non-flexible node, the at least one flexible node is directly connected to the controller, the at least one non-flexible node is indirectly connected to the controller, and the controller comprises:

at least one processor; and
a memory storing a plurality of computer executable instructions which, when executed by the at least one processor, cause the controller to:
  determine at least one sampling node in the at least one flexible node and a temporal frequency for traffic sampling;
  instruct the at least one sampling node to perform traffic sampling at the temporal frequency;
  receive sampled traffic data of all sampling nodes obtained during each sampling;
  determine, according to the sampled traffic data obtained during each sampling and information about total traffic of a link in the communications network whose link utilization is greater than a first preset value or less than a second preset value, parameter information for traffic engineering, wherein the information about total traffic of the link is determined based on the sampled traffic data; and
  perform traffic engineering control according to the parameter information.

12. The controller according to claim 11, wherein:
the sampled traffic data comprises service traffic that passes through or starts from the at least one sampling node in the communications network and goes to each destination node in the communications network.

13. The controller according to claim 11, wherein the memory stores computer readable instructions which, when executed by the at least one processor, further cause the controller to: determine, according to estimated total traffic of a service in the communications network, the at least one sampling node and the temporal frequency for traffic sampling.

14. The controller according to claim 13, wherein the memory stores computer readable instructions which, when executed by the at least one processor, further cause the controller to: determine a quantity of the at least one sampling node and the temporal frequency according to the following formulas:

$$|C_s|=\gamma_{11}|C|$$

$$V*T_s=\gamma_{12}\log(|C_s|)$$

or $$|C_s|=\log(\gamma_{21}|C|)$$

$$V*T_s=\gamma_{22}|C_s|,$$

where $|C_s|$ indicates the quantity of sampling nodes, $T_s$ indicates the sampling frequency, V indicates the estimated total traffic, C indicates a set of flexible nodes in the communications network, $|C|$ indicates a quantity of flexible nodes in the communications network, $\gamma_{11}$, $\gamma_{12}$, $\gamma_{21}$, and $\gamma_{22}$ are preset constant parameters, $0<\gamma_{11}<1$, and $0<\log(\gamma_{21}|C|)<|C|$; and after determining the quantity of sampling nodes, the controller randomly selects $|C_s|$ nodes from the set of flexible nodes, and uses the $|C_s|$ nodes as a set of the sampling nodes; or the memory stores computer readable instructions which, when executed by the at least one processor, further cause the controller to: determine a quantity of the at least one sampling node and the temporal frequency for each destination node d according to the following formulas:

$$|C_s^d|=\gamma_{11}^d|C|$$

$$V^d * T_s^d = \gamma_{12}^d \log(|C_s^d|)$$

or $$|C_s^d| = \log(\gamma_{21}^d |C|)$$

$$V^d * T_s^d = \gamma_{22}^d |C_s^d|,$$

where $|C_s^d|$ indicates a quantity of sampling nodes corresponding to the destination node d, $T_s^d$ indicates a sampling frequency corresponding to the destination node d, $V^d$ indicates estimated total traffic to the destination node d, C indicates a set of flexible nodes in the communications network, $|C|$ indicates a quantity of flexible nodes in the communications network, $\gamma_{11}^d$, $\gamma_{12}^d$, $\gamma_{21}^d$, and $\gamma_{22}^d$ are preset constant parameters, $0 < \gamma_{11}^d < 1$, and $0 < \log(\gamma_{21}^d |C|) < |C|$; and after determining the quantity of sampling nodes, selecting, by the controller and for each destination node d, $|C_s^d|$ nodes in a directed acyclic graph DAG that is pre-generated based on a topology of flexible nodes and using the $|C_s^d|$ nodes as a set of the sampling nodes, or randomly selecting $|C_s^d|$ nodes from the set of flexible nodes and using the $|C_s^d|$ nodes as a set of the sampling nodes.

15. The controller according claim 11, wherein the parameter information for traffic engineering comprises injected service traffic from each flexible node to each destination node in the communications network and uncontrollable service traffic in a link whose link utilization is greater than a preset value in the communications network; and the at least one processor is configured to determine, according to the following formula (1), the parameter information for traffic engineering:

$$\operatorname*{Min}_{\Delta I} \| vec(\Delta I) \|_{l_0} \qquad (1)$$

wherein constraint conditions are:

$$W_{wd} = \sum_{u \leq w} \beta_w(u, d) I_{ud}$$

$$I_{current} = I_{ud} = \Delta I + I_{last\ iteration}$$

$$g(e) = f(e) - \sum_{u \in C} \sum_{d \in N} \alpha_e(u, d) I_{ud}, \forall\, e \in E$$

wherein E indicates a set of all links in the communications network, N indicates a set of all flexible nodes in the communications network, C indicates a set of all flexible nodes in the communications network, w indicates a sampling node, u indicates a flexible node, d indicates a destination node, $\Delta I$ indicates a difference between injected traffic $I_{ud}$ of the flexible node u that is obtained during current sampling and injected traffic $I_{last\ iteration}$ of the flexible node u that is obtained during previous sampling, $vec(\Delta I)$ indicates that all elements $\Delta I$ (for all flexible nodes u) are combined as a vector, $\operatorname*{Min}_{\Delta I} \| vec(\Delta I) \|_{l_0}$ indicates a minimum $l_0$ norm of vec($\Delta I$), e indicates a link whose link utilization is greater than the first preset value or a link whose link utilization is less than the second preset value in the communications network, f(e) indicates total traffic of the link e, g(e) indicates uncontrollable service traffic in the link e, $W_{wd}$ indicates service traffic that passes through or starts from the sampling node w in the communications network and goes to the node d in the communications network, $I_{ud}$ indicates injected service traffic from the flexible node u to the destination node d, $\alpha_e(u,d)$ indicates a total fraction of a packet that is transmitted from the node u to the destination node d and passes through the link e, $\beta_w(u,d)$ indicates a total fraction of a packet that is transmitted from the node u to the destination d and passes through the sampling node w, and $u \leq w$ indicates that w is passed through by a packet transmitted from u.

16. The controller according claim 11, wherein the parameter information for traffic engineering comprises injected service traffic from each flexible node to each destination node in the communications network and uncontrollable service traffic in a link whose link utilization is greater than a preset value in the communications network; and the memory stores computer readable instructions which, when executed by the at least one processor, further cause the controller to: determine, according to one of the following formula (2), formula (3), or formula (4), the parameter information for traffic engineering:

$$\min_{\Delta I} \| vec(\Delta I) \|_{l_1} \qquad (2)$$

wherein constraint conditions are:

$$W_{wd} = \sum_{u \leq w} \beta_w(u, d) I_{ud} \quad \forall\, w \in C_s, d \in N$$

$$I_{current} = I_{ud} = \Delta I + I_{last\ iteration}$$

$$g(e) = f(e) - \sum_{u \in C} \sum_{d \in N} \alpha_e(u, d) I_{ud}, \forall\, e \in E$$

wherein E indicates a set of all links in the communications network, N indicates a set of all flexible nodes in the communications network, C indicates a set of all flexible nodes in the communications network, w indicates a sampling node, u indicates a flexible node, d indicates a destination node, $\Delta I$ indicates a difference between injected traffic $I_{ud}$ of the flexible node u that is obtained during current sampling and injected traffic $I_{last\ iteration}$ of the flexible node u that is obtained during previous sampling, vec($\Delta I$) indicates that all elements $\Delta I$ (for all flexible nodes u) are combined as a vector, $$\min_{\Delta I} \| vec(\Delta I) \|_{l_1}$$

indicates a minimum $l_1$ norm of vec($\Delta I$), e indicates a link whose link utilization is greater than the first preset value or a link whose link utilization is less than the second preset value in the communications network, f(e) indicates total traffic of the link e, g(e) indicates uncontrollable service traffic in the link e, $W_{wd}$ indicates service traffic that passes through or starts from the sampling node w in the communications network and goes to the node d in the communications network, $I_{ud}$ indicates injected service traffic from the flexible node u to the destination node d, $\alpha_e(u,d)$ indicates a total fraction of a packet that is transmitted from the node u to the destination d and passes through the link e, $\beta_w(u,d)$ indicates a total fraction of a packet that is transmitted from the node u to the destination d and passes through the sampling node w, and $u \leq w$ indicates that w is passed through by a packet transmitted from u;

$$\min_{\Delta I} \|\operatorname{diag}(m)\operatorname{vec}(\Delta I)\|_{l_1} \quad (3)$$

wherein constraint conditions are:

$$W_{wd} = \sum_{u \leq w} \beta_w(u,d) I_{ud} \quad \forall w \in C_s, d \in N$$

$$I_{current} = I_{ud} = \Delta I + I_{last\ iteration}$$

$$g(e) = f(e) - \sum_{u \in C}\sum_{d \in N} \alpha_e(u,d) I_{ud}, \forall e \in E$$

wherein m indicates a weight, $$m = \frac{1}{\varepsilon + |\Delta I|},$$

an initial value of m is 1, diag(m) indicates a diagonal matrix, and if a $u^{th}$ element of vec($\Delta I$) is $\Delta I$, a $u^{th}$ diagonal element of the diagonal matrix is $$m = \frac{1}{\varepsilon + |\Delta I|}; \text{ and } \min_{\Delta I}\|\operatorname{diag}(m)\operatorname{vec}(\Delta I)\|_{l_1}$$

indicates a minimum $l_1$ norm of diag(m)vec($\Delta I$);

$$\min_{\Delta I}\|\operatorname{vec}(\Delta I)\|_{l_p} \quad (4)$$

wherein constraint conditions are:

$$W_{wd} = \sum_{u \leq w} \beta_w(u,d) I_{ud} \quad \forall w \in C_s, d \in N$$

$$I_{current} = I_{ud} = \Delta I + I_{last\ iteration}$$

$$g(e) = f(e) - \sum_{u \in C}\sum_{d \in N} \alpha_e(u,d) I_{ud}, \forall e \in E; \text{ and}$$

$$\min_{\Delta I}\|\operatorname{vec}(\Delta I)\|_{l_p}$$

indicates a minimum $l_p$ norm of vec($\Delta I$), and $0 < p \leq 1$.

17. The controller according to claim 11, wherein the memory stores computer readable instructions which, when executed by the at least one processor, further cause the controller to: minimize a cost involving all paths in the communications network according to the parameter information.

18. The controller according to claim 17, wherein the memory stores computer readable instructions which, when executed by the at least one processor, further cause the controller to: minimize a network cost of the communications network according to the following formula (5):

$$\min_{x(P)} U_c(\{\rho(e)\}_{\forall e}) \quad (5)$$

wherein constraint conditions are:

$$\sum_{P \in P_{ud}} x(P) = I_{ud} \quad \forall u \in C, d \in N$$

$$x(P) \geq 0 \ \forall P$$

wherein e indicates the link, E indicates a set of all links, C indicates a set of flexible nodes, u indicates the flexible node, d indicates a destination node, N indicates a set of all nodes, $I_{ud}$ indicates injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P \in P_{ud}} x(P)$$

indicates total traffic of all feasible paths from u to d, and $\rho(e)$ indicates controllable bandwidth utilization of the link e, that is, $$\rho(e) \cong \frac{\sum_{P:e \in P} x(P)}{c(e) - g(e)},$$

wherein c(e) indicates total bandwidth of the link e, g(e) indicates uncontrollable traffic of the link e, and $$\sum_{P:e \in P} x(P)$$

indicates total controllable traffic of all feasible paths on the link e; and $U_c(\{\rho(e)\}_{\forall e})$ indicates the network cost.

19. The controller according to claim 17, wherein the memory stores computer readable instructions which, when executed by the at least one processor, further cause the controller to: minimize a cost of all paths in the communications network according to the following formula (6):

$$\min_{x(P)} \max_{P \in P_{ud}} U_c^P(\{\rho(e)\}_{\forall e \in P}) \quad (6)$$

wherein constraint conditions are:

$$\sum_{P \in P_{ud}} x(P) = I_{ud} \quad \forall u \in C, d \in N$$

$$x(P) \geq 0 \ \forall P$$

wherein e indicates the link, E indicates a set of all links, C indicates a set of flexible nodes, u indicates the flexible node, d indicates a destination node, N indicates a set of all nodes, $I_{ud}$ indicates injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P \in P_{ud}} x(P)$$

indicates total traffic of all feasible paths from u to d, and ρ(e) indicates controllable bandwidth utilization of the link e, that is, $$\rho(e) \cong \frac{\sum_{P:e \in P} x(P)}{c(e) - g(e)},$$

where c(e) indicates total bandwidth of the link e, g(e) indicates uncontrollable traffic of the link e, and $$\sum_{P:e \in P} x(P)$$

indicates total controllable traffic of all feasible paths on the link e; and $U_c(\{\rho(e)\}_{\forall e})$ indicates a cost of the path P.

20. The controller according to claim 17, wherein the memory stores computer readable instructions which, when executed by the at least one processor, further cause the controller to: minimize a cost of all paths in the communications network according to a formula (5-11):

$$\min_{x(P),\theta} \theta \quad (5\text{-}11)$$

wherein constraint conditions are:

$$\sum_{P:e \in P} x(P) \leq h_e(\theta)(c(e) - g(e)) \ \forall \, e \in E$$

$$\sum_{P \in P_{ud}} x(P) = I_{ud} \ \forall \, u \in C, d \in N$$

$$x(P) \geq 0 \ \forall \, P$$

$$0 \leq h_e(\theta) \leq 1$$

wherein e indicates the link, E indicates a set of all links, C indicates a set of flexible nodes, u indicates the flexible node, d indicates a destination node, N indicates a set of all nodes, $I_{ud}$ indicates injected service traffic from the flexible node u to the destination node d, $P_{ud}$ indicates a set of all feasible paths from u to d, $P \in P_{ud}$ indicates that P is a feasible path in $P_{ud}$, x(P) indicates traffic of the path P, $$\sum_{P \in P_{ud}} x(P)$$

indicates total traffic of all feasible paths from u to d, λ indicates a maximum network throughput proportion, θ indicates a parameter related to maximum link utilization, $h_e(\theta)$ indicates a relation function of weight parameters and θ, the weight parameters comprise $\gamma_e$ and $\gamma_P$, $\gamma_e$ indicates a weight parameter of the link e, $\gamma_P$ indicates a weight parameter of the path P, c(e) indicates total bandwidth of the link e, g(e) indicates uncontrollable traffic of the link e, and $$\sum_{P:e \in P} x(P)$$

indicates total controllable traffic of all feasible paths on the link e; and $h_e(\theta)$ may be one of the following according to different weight values of the weight parameters $\gamma_e$ and $\gamma_P$:

$$h_e(\theta) = \frac{1}{\gamma_e} \frac{\theta}{\max_{P:e \in P} \gamma_P};$$

$$h_e(\theta) = \exp\left(\frac{1}{\gamma_e} \frac{\log \theta}{\max_{P:e \in P} \gamma_P}\right) \text{ or }$$

$$\theta^{\frac{1}{\gamma_e} \frac{1}{\max_{P:e \in P} \gamma_P}};$$

$$h_e(\theta) = \exp\left(\frac{1}{\gamma_e} \log\left(\frac{\theta}{\max_{P:e \in P} \gamma_P}\right)\right) \text{ or }$$

$$\left(\frac{\theta}{\max_{P:e \in P} \gamma_P}\right)^{\frac{1}{\gamma_e}}; \text{ or}$$

$$h_e(\theta) = \frac{1}{\gamma_e} \exp\left(\frac{\log \theta}{\max_{P:e \in P} \gamma_P}\right) \text{ or }$$

$$\frac{1}{\gamma_e} \theta^{\frac{1}{\max_{P:e \in P} \gamma_P}}.$$

* * * * *

UNITED STATES PATENT AND TRADEMARK OFFICE
CERTIFICATE OF CORRECTION

PATENT NO. : 10,764,161 B2
APPLICATION NO. : 16/054087
DATED : September 1, 2020
INVENTOR(S) : Shui Wing David Hui and Gong Zhang Page 1 of 2

It is certified that error appears in the above-identified patent and that said Letters Patent is hereby corrected as shown below:

In the Specification

In Column 58, Line 13, in Claim 4, delete "where" and insert -- wherein --, therefor.

In Column 58, Line 36, in Claim 4, delete "where" and insert -- wherein --, therefor.

In Column 60, Line 57, in Claim 6, before "initial" insert -- an --.

In Column 60, Line 60, in Claim 6, after "diagonal" delete "a".

In Column 62, Line 53, in Claim 9, delete "where" and insert -- wherein --, therefor.

In Column 62, Line 62, in Claim 9, delete "$U_c(\{\rho(e)\}_{\forall e})$" and insert -- $U_c^P(\{\rho(e)\}_{\forall e})$ --, therefor.

In Column 63, Line 56-57, in Claim 10, delete "$\frac{1}{\gamma_e}\theta^{\frac{1}{max_{P:e\in P}\gamma_P}}$." and insert -- $\frac{1}{\gamma_e}\theta^{\frac{1}{max_{P\ni e}\gamma_P}}$ --, therefor.

In Column 64, Line 50, in Claim 14, delete "where" and insert -- wherein --, therefor.

In Column 65, Line 8, in Claim 14, delete "where" and insert -- wherein --, therefor.

In Column 65, Line 17-18, in Claim 14, delete "selecting, by the controller and" and insert -- the at least one processor selects, --, therefor.

In Column 65, Line 21, in Claim 14, delete "using" and insert -- uses --, therefor.

In Column 65, Line 22, in Claim 14, delete "selecting" and insert -- selects --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,764,161 B2

In Column 65, Line 23, in Claim 14, delete "using" and insert -- uses --, therefor.

In Column 69, Line 15, in Claim 19, delete "where" and insert -- wherein --, therefor.

In Column 69, Line 24, in Claim 19, delete "$U_c(\{\rho(e)\}_{\forall e})$" and insert -- $U_c^P\left(\{\rho(e)\}_{\forall e}\right)$ --, therefor.

In Column 70, Line 35, in Claim 20, delete "$\theta^{\frac{1}{\gamma_e}\frac{1}{\max_{P:e\in P}\gamma_P}}$;" and insert -- $\theta^{\frac{1}{\gamma_e}\frac{1}{\max_{P:e\in P}\gamma_P}}$; --, therefor.

In Column 70, Line 46, in Claim 20, delete "$\frac{1}{\gamma_e}\theta^{\frac{1}{\max_{P:e\in P}\gamma_P}}$." and insert -- $\frac{1}{\gamma_e}\theta^{\frac{1}{\max_{P:e\in P}\gamma_P}}$. --, therefor.